United States Patent [19]

Saeki et al.

[11] Patent Number: 4,962,529
[45] Date of Patent: Oct. 9, 1990

[54] SCRAMBLING METHOD FOR TV PICTURE

[75] Inventors: Yoshifumi Saeki; Shigeru Watanabe, both of Tokyo, Japan

[73] Assignee: Pioneer Electronic Corporation, Tokyo, Japan

[21] Appl. No.: 870,297

[22] Filed: May 23, 1986

Related U.S. Application Data

[63] Continuation of Ser. No. 510,139, Jul. 1, 1983, abandoned.

[30] Foreign Application Priority Data

Jul. 4, 1982 [JP] Japan ................... 57-114237

[51] Int. Cl.$^5$ .......................................... H04N 7/167
[52] U.S. Cl. ........................................ 380/15; 380/20
[58] Field of Search ................................ 358/120, 122

[56] References Cited

U.S. PATENT DOCUMENTS

| | | | |
|---|---|---|---|
| 3,081,376 | 3/1963 | Loughlin et al. | 358/120 |
| 3,919,462 | 11/1975 | Hartung et al. | 358/124 |
| 4,222,068 | 9/1980 | Thompson | 358/120 |
| 4,245,246 | 1/1981 | Cheung | 358/124 |
| 4,336,553 | 6/1982 | den Toonder et al. | 358/120 |
| 4,396,947 | 8/1983 | Cheung | 358/120 X |
| 4,398,215 | 8/1983 | Osaka | 358/120 |
| 4,408,225 | 10/1983 | Ensinger et al. | 358/120 |
| 4,454,544 | 6/1984 | Abbott | 358/120 |
| 4,466,017 | 8/1984 | Banker | 380/15 |
| 4,467,353 | 8/1984 | Citta et al. | 358/120 |
| 4,471,380 | 9/1984 | Mobley | 358/120 |
| 4,527,195 | 7/1985 | Cheung | 358/120 |
| 4,536,791 | 8/1985 | Campbell et al. | 358/122 |
| 4,621,285 | 11/1986 | Schilling et al. | 358/122 X |

Primary Examiner—Thomas H. Tarcza
Assistant Examiner—Linda J. Wallace
Attorney, Agent, or Firm—Sughrue, Mion, Zinn, Macpeak & Seas

[57] ABSTRACT

A scrambling method for TV pictures avoids picture deterioration by level compressing only selected horizontal flyback portions of the video signal to effect scrambling. A key signal is superposed on selected horizontal synch signals and, when removed at the decoder, enables level expansion of those horizontal flyback portions compressed in order to allow the TV receiver to effect synchronization. Data signals for enabling or disabling reception of particular programming such as paid programs may be superimposed on other selected horizontal synch signals.

10 Claims, 18 Drawing Sheets

BEFORE SCRAMBLING

AFTER SCRAMBLING

FIG. 16

| | | | | | |
|---|---|---|---|---|---|
| KEY SIGNAL | 16L | $K_0$ | $K_1$ | $K_2$ | $K_3$ |
| | 17L | $K_4$ | $K_5$ | $K_6$ | $K_7$ |
| GROUP ADDRESS SIGNAL | 18L | | $G_0$ | $G_1$ | $G_2$ |
| | 19L | $G_3$ | $G_4$ | $G_5$ | $G_6$ |
| | 20L | $G_7$ | $G_8$ | $G_9$ | $G_{10}$ |
| PERSONAL ADDRESS SIGNAL | 21L | $B_0$ | $B_1$ | $B_2$ | $B_3$ |
| | 22L | $B_4$ | $B_5$ | $B_6$ | $B_7$ |
| | 23L | $B_8$ | $B_9$ | $B_{10}$ | $B_{11}$ |
| | 24L | $B_{12}$ | $B_{13}$ | $B_{14}$ | $B_{15}$ |
| | 25L | $B_{16}$ | $B_{17}$ | $B_{18}$ | $B_{19}$ |
| | 26L | $B_{20}$ | | | |
| | 142L | $B_{484}$ | $B_{485}$ | $B_{486}$ | $B_{487}$ |
| | 143L | $B_{488}$ | $B_{489}$ | $B_{490}$ | $B_{491}$ |
| | 144L | $B_{492}$ | $B_{493}$ | $B_{494}$ | $B_{495}$ |
| | 145L | $B_{496}$ | $B_{497}$ | $B_{498}$ | $B_{499}$ |
| | 146L | $B_{500}$ | $B_{501}$ | $B_{502}$ | $B_{503}$ |
| | 147L | $B_{504}$ | $B_{505}$ | $B_{506}$ | $B_{507}$ |
| | 148L | $B_{508}$ | $B_{509}$ | $B_{510}$ | $B_{511}$ |

FIG. 18(a) VIDEO SIGNAL WITH DATA SIGNAL ADDED

FIG. 18(b) VIDEO SIGNAL WITH DATA SIGNAL REMOVED

FIG. 18(c) DATA TRAP TIMING (SIGNAL q)

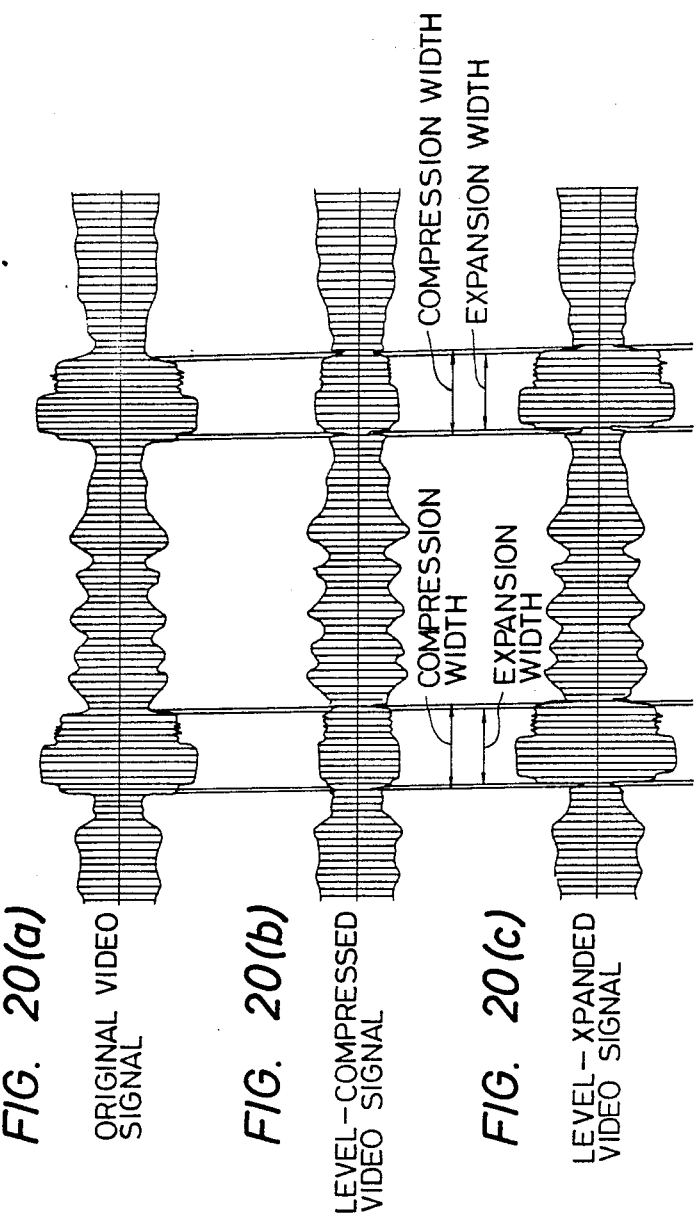

SCRAMBLING METHOD FOR TV PICTURE

This is a continuation of application Ser. No. 510,139, filed July 1, 1983, now abandoned.

BACKGROUND OF THE INVENTION

In television broadcasting services (including both wireless and cabled transfer), the present invention relates to a method enabling the watching of normal TV pictures restored to be so by a prescribed means (descrambling) while it may not be possible to do so by reception of the broadcast images directly. More particularly the present invention relates to a TV picture scrambling method making possible the transfer of TV pictures, by means of key and address signals combined into selected video signals upon generating key signals to be used for restoring later TV pictures as they will have been received, and address signals permitting terminal equipment to receive said program.

In conventional TV broadcasting services, either by wireless or cable, programs can be watched on normal, standard TV sets, within respective areas covered by service networks, by reproducing TV pictures as received. However, it is necessary to make it possible to view TV programs only on TV sets owned by specific subscribers, but not by others with respect to paid TV broadcasting services. Particularly, in CATV broadcasting services capable of providing various programs, the operation of such CATV stations is dependent on the fees paid for programs, so that the segregation of subscribers is essential. For that reason, transmitters of programs require a scrambling method which manipulates the pictures transmitted so that they cannot be reproduced as normal pictures if received as they are.

Firstly, a CATV system will be outlined hereunder with reference to FIG. 1.

This system has a unique chargeable program broadcasting function.

FIG. 1 shows the entire CATV system. This system comprises a center 1 and thousands and thousands of terminal equipment units 28 connected therewith by means of coaxial cables. From the center 1 is laid a trunk line cable 3 on which are installed at predetermined points a trunk line amplifiar 4 and a branch box, respectively. From this branch box 5 are drawn a plurality of branch cables 6, and each branch cable 6 is provided at predetermined points with a branch amplifier 7 and a tapoff 8, respectively. From each tapoff 8 are drawn plurality of sub-branch cables 9; each terminal thereof is drawn into a household 2. The terminal equipment 28 in each household 2 comprises a main box 10, a TV set 11 and a control box 12. The terminal of a sub-branch cable 9 is connected to the main box 10, the TV set 11 and the control box 12. That is, the center 1 and every terminal unit 28 in subdivisioned households are interconnected in a Christmas tree manner.

Outside the aforementioned center 1 is erected a receiving antenna 13, and this is connected to a demodulator in a source group 14. In this source group are a video-disc player 16, video-tape recorder 17, studio 18 and so forth. A modulation transmitting part 19 that receives signals from the source group 14 comprises two systems: one consists of an IF modulator circuit 20, a scrambling circuit 21 and an up converter circuit 22; and the other, an IF modulator circuit 23 and an up converter circuit 24. Respective outputs from the up converter circuits 22 and 24 are connected to the trunk line cable 3. The trunk line cable 3 is also connected to a data transmitter/receiver set 25 that communicates with each main box 10. To the data transmitter/receiver set 25 is connected a computer 26 to which is connected peripheral equipment 27 including a printer, display, etc.

The operation of this CATV system will now be described. Turning ON the TV set 11 and operating the control box 12 to select a desired channel enables pictures to be supplied to the TV set 11 through conversion, by means of the main box 10, of a frequency for said channel into that for an idle channel. Type of channels selectable by means of the control box 12 comprise:

(A) retransmissions for receiving programs as they are;

(B) self-sustained programs (free of charge); and (c) chargeable programs. Each group has several channels, respectively, thus making a total of some 20–30 or more selections available.

(A) Retransmission:

Electromagnetic waves received by the receiving antenna 13 are demodulated by means of the demodulator 15 and delivered to the modulation transmitting section 19. The signal is then modulated in the IF modulator circuit 23 and the modulated signal is raised to a specific frequency in the up converter circuit 24. This signal, having been modulated and positioned to a specific channel, is transmitted by way of the trunk line cable 3, branch cables 6 and the sub-branch cables 9 to the households 2 and is received by the TV sets 11 through the medium of the terminal equipment 28.

(B) Self-sustained Programs:

These programs include weather forecasts, newswires, stock quotations and the like. Recorded programs regenerated by the video-disc player 16 or the video-tape recorder 17 and live programs produced in the studio 18 are transmitted to the trunk line cable 3 upon being modulated and subsequently converted into a frequency for a specific channel in the IF modulator circuit 13 and the up converter 24, respectively. These programs are free of charge regardless of the number of times of reception or hours thereof, and each household may receive these programs upon monthly payment of a base fee.

(C) Chargeable Programs:

These programs include newly produced motion pictures and other specific programs. Recorded programs are regenerated on the video-disc player 16 or the video-tape recorder 17, and live programs produced in the studio 18 are modulated in the IF modulator circuit 20, followed by adding to the video signal a specific synchronizing signal in the scrambling circuit 21, to manipulate the picture signals so that they will not appear as normal pictures upon reception of the same as they are. The frequency of the signal is then raised in the up converter circuit 22 to that for a specific channel and the signal is then sent to the trunk line cable 3. Each household 2 desiring to watch this chargeable program may be able to do so by demodulating the received signals into normal video signals in the main box 10. For reception of chargeable programs, the fees are calculated on a pre-established basis and are added to the monthly base fee on a bill.

The aforementioned center 1 and the terminal equipment 28 of every household 2 are connected by means of coaxial cables, but unless the reception of pictures on certain channels by households 2 is periodically verified, the fair operation of a CATV system cannot be expected because, if not, discrimination between chargeable and free of charge accounts based on programs received is not feasible. For this purpose the data transmitter/receiver set 25 is provided to determine the signals being received during a retrieval time (so-called polling) be transmitting a retrieval signal at a certain time interval, calling main boxes 10 in every terminal unit 28 using a unique address number assigned to each main box 10. Each main box 10, in response to the polling signal, generates an answer as to the channel through which pictures are being received, and transmits it back to the data transmitter/receiver set 25. The data received by the data transmitter/receiver set 25 are put through data processing by the computer 26 and are displayed on or printed out by the peripheral equipment 27. Polling is carried out at a certain time interval (several-tens of second), thus making it possible to sum ratings, etc. at once. Some programs invite participation by the audience; in which the audience may be able to answer, while watching on the TV sets 11, the question asked in the program by operating the control box 12. The answers (data) are sent to the center 1 through the coaxial cables.

For certain programs in conventional TV broadcasting, video signals transmitted from the center 1 are scrambled (privacy transfer). In order to receive these scrambled pictures as normal, a descrambling process is required at each terminal unit 28 to demodulate the same into regular picture signals. If the scrambling process is primitive and very easily descrambled, wiretapping may not be prevented. A high level scrambling method for preventing ready wiretapping has been in demand for the operation of TV signal transfer systems.

A conventional scrambling method will firstly be described. As a conventional scrambling method, there is known a so-called "Graysync Method" which is designed to vary at the transmitting side, the modulation of the horizontal synchronizing signal in a video signal at the RF stage to enhance the percentage modulation of the horizontal synchronizing signal. That is, scrambling in practice is carried out by making sine waves (an encoding signal) of 15.75 KHz (or an integral multiple,)in synchronism with the horizontal signal, followed by AM modulation by means of these sine waves of the video signal. In order to bring the picture back to the original condition, the receiving side must provide the aforementioned encoding signal of 15.75 KHz sine waves (or integral multiple) (a decoding signal) of inverted phase to carry out descrambling to thereby demodulate the scrambled picture picture signal.

In this scrambling method, TV sets detect the synchronizing pulse from the video signal, making it the horizontal scanning reference. For detecting the synchronizing pulse, the peak point whereat the amplitude is the largest when provided with amplitude modulation is considered to be the synchronizing pulse. For this purpose a synchronizing pulse separator circuit consisting of a peak detector, etc. is used. For TV video signals in the NTSC system, the large amplitude signals are black color picture content information, but the synchronizing pulse under normal conditions is larger in amplitude than that of the black color information. The amplitude of this synchronizing pulse in the video signal is compressed toward the white side; that is, toward gray, for transmission upon being modulated.

This is the conventional scrambling method, and is the origin of the term "Graysync". The synchronizing pulse separator circuit processes, in this manner, a video signal, and, at the same time, determines a portion other than the normal synchronizing pulse (the peak point of a black portion of the picture signal) to be the synchronizing pulse, thus providing disturbed pictures only, resulting in a scrambled effect destroying the pictures.

As explained above, the conventional graysync method, for scrambling purposes, uses periodically varying encoding signals provided with phase synchronization in the direction wherein a synchronizing pulse portion is compressed. This encoding signal may sometimes be in the form of a sine wave having a cycle identical to that of the horizontal synchronizing signal, its higher harmonic, or a composite wave, but in any event was a continuous wave matched to a phase capable of compressing the horizontal synchronizing pulse. (Although vertical synchronizing pulse portions may be exempted, for portions forming a picture, there is used, at least, an identical encoding signal for a portion of the horizontal scanning line.) The encoding signal (key signal) used for level compression of the horizontal synchronizing signal, including the degree of modulation and phase, is transmitted to the terminal equipment by other means of transmission (a channel for key signal transmission), and the terminal equipment provides processing in the reverse order to that of the scrambling process; that is, level expansion of the horizontal synchronizing signal by means of the key signal, to bring the scrambled video signals back into normal video signals receivable by ordinary TV sets. Consequently, the transmission means for the key signal, because it transmits analog signals, must transmit them in precise phase, at precise timing and in precise encoding quantity. Further, for encoding signals in analogous waveforms the inclusion of noise and distortion takes place during transmission, and in the modulation/demodulation system must be adequately removed. If no attention is paid to this, and if unnecessary components (noise, etc.) break into the encoding signals, spurious modulation take place, resulting in scarred pictures upon restoration. This should be avoided especially with respect to paid programs, because, by their nature, the provision of superior quality pictures is essential for system operation.

The principles and operation of the graysync method, a conventional scrambling method, has been described heretofore. It should be noted, however, that there are drawbacks common to any conventional graysinc method:

(1) It is likely to involve noise and/or distortion because of the adoption of analogous processes in descrambling. That is, because of the commonness of the system wherein key signals are transmitted in the form of an analog waveform upon being processed through AM or other multiplex modulation, when they are transmitted upon being modulated into audio carriers or other sub-carriers for the scrambling channel, faults were likely to take place in the restored pictures because of interference taking place with the transmission channel, wherethrough are transmitted scrambled TV video signals, and/or with modulation/demodulation systems, with interference taking place with the key signals. In short, as encoding is taking place, the level compression on the horizontal synchronizing signals involves a video information portion to be subjected, as well, to level compression and expansion. As a result, the inclusion of noise takes place affecting the picture portion during the decoding process. At the portion to be expanded, background noise would be enhanced as well, thus causing that portion of the picture to be coarse. The degree of the coarseness might not be a problem if that part alone was considered, but it would become more obvious when regenerated as a part of a picture in relation to other parts thereof having a better S/N ratio.

(2) Privacy transferability was comparatively low because of the simpleness of the scrambling and descrambling processes. That is, the use of comparatively simple continuous waves such as sine waves, etc. for encoding signals (key signals) for scrambling made it comparatively easier to wiretap if such was intended at a terminal side. It was therefore feared that the former system hindered paid TV broadcasting systems from achieving fair operation.

SUMMARY OF THE INVENTION

In order to overcome such drawbacks in the conventional method, the present invention provides a scrambling method in which only the horizontal retrace (flyback) line section of a video signal is subjected to level compression making the synchronization of the picture not possible. Upon demodulation, only the horizontal flyback line section is subjected to level expansion. With this method other portions of the video signal are not processed at all, and, therefore, not affected adversely when the video signal is demodulated at the TV set. Horizontal flyback line sections are arbitrarily level compressed timewisely depending on a pseudo random number transmitted as an information key signal through an identical channel, thus making it possible for TV sets to reproduce complete pictures by separating this key signal and analysing it, and by, upon restoring the video signal, selecting the portions requiring level expansion. The effect of scrambling becomes more faultless by periodically varying the pseudo random numbers (for double protection against wiretapping) and continously transmitting those pseudo random numbers as key signals.

BRIEF DESCRIPTION OF THE DRAWINGS

FIG. 16 schematically illustrates data demodulation and its order at the encoder;

FIGS. 20(a)-(c) shows waveforms indicating the relationship between level compression and level expansion by means of the actual state of video signals modulated by carriers.

DETAILED DESCRIPTION OF THE PREFERRED EMBODIMENTS

Figure 2:
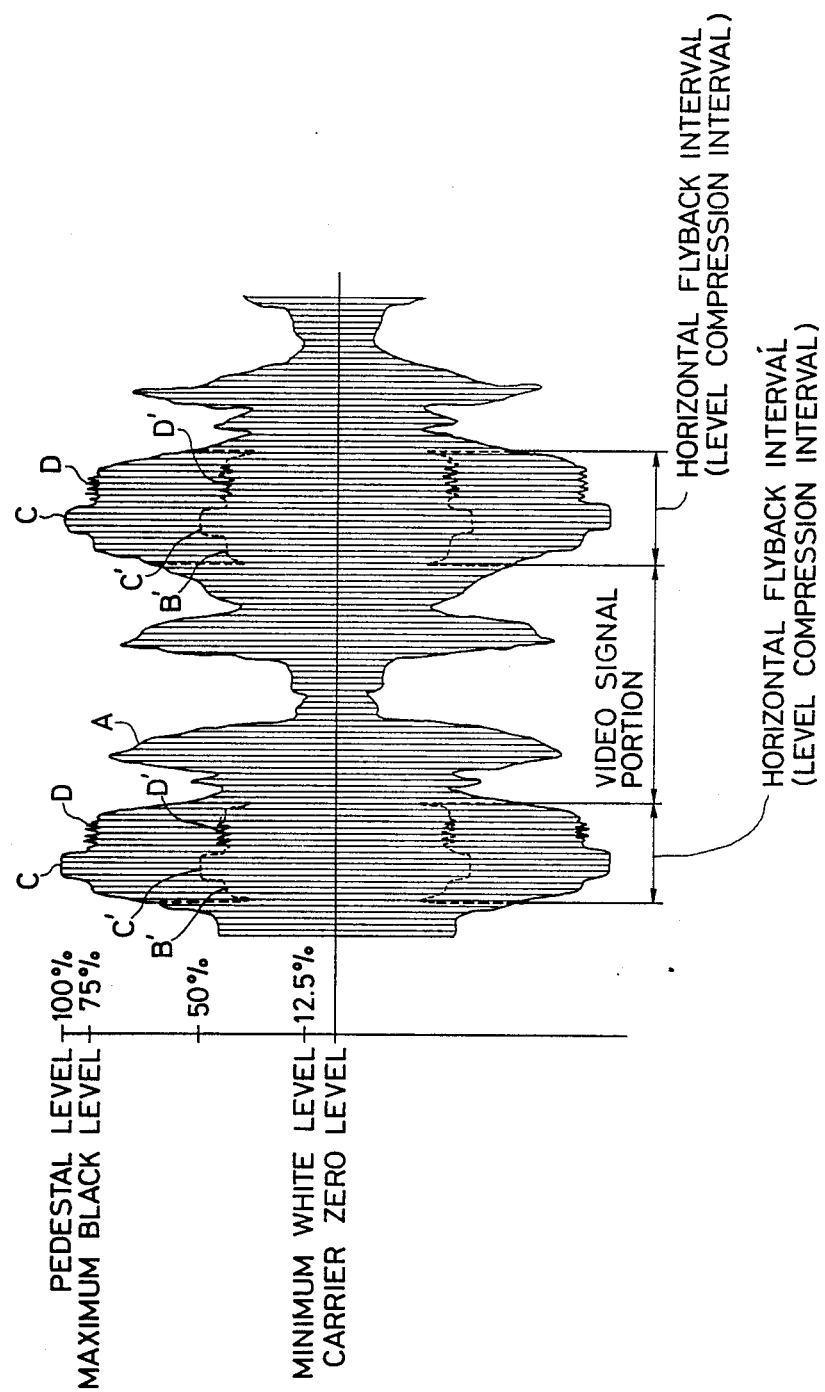
FIG. 2 shows a waveform illustrating the principles of a scrambling method in accordance with the present invention.

FIG. 2 shows the waveform of the video signal for the scrambling method according to the present invention, wherein the video signal is modulated by a carrier. In this video signal are positioned a horizontal synchronizing signal at a 100% level of percentage modulation in relation to the peak carrier; a video signal of the deepest black at about a 70% modulation level; and a video signal of the most white at about a 12.5% level. Consequently, this indicates that with color shades for black and white in a picture being AM modulated in the range of 12.5–70%, only the horizontal synchronizing signal takes a position at the largest amplitude of 100%, and is possible to use for timing synchronization of the scanning lines, upon separating the horizontal synchronizing signal. A waveform indicated by solid line A in the video signal shown in FIG. 2 represents the condition before being scrambled; the waveform in broken lines B', the condition after being compressed by the level compression involved in the scrambling, where only the horizontal flyback line section varies toward the direction of the white level, having a lower percentage modulation, while other video signal portions remain unchanged with respect to percentage modulation, indicating that only the horizontal flyback line section has been compressed upon level compression. In the horizontal flyback line section are a horizontal synchronizing signal C modulated to 100%, and at a shoulder portion having a slightly lower percentage modulation than that for the horizontal synchronizing signal C is added a color burst signal D.

Figure 3:
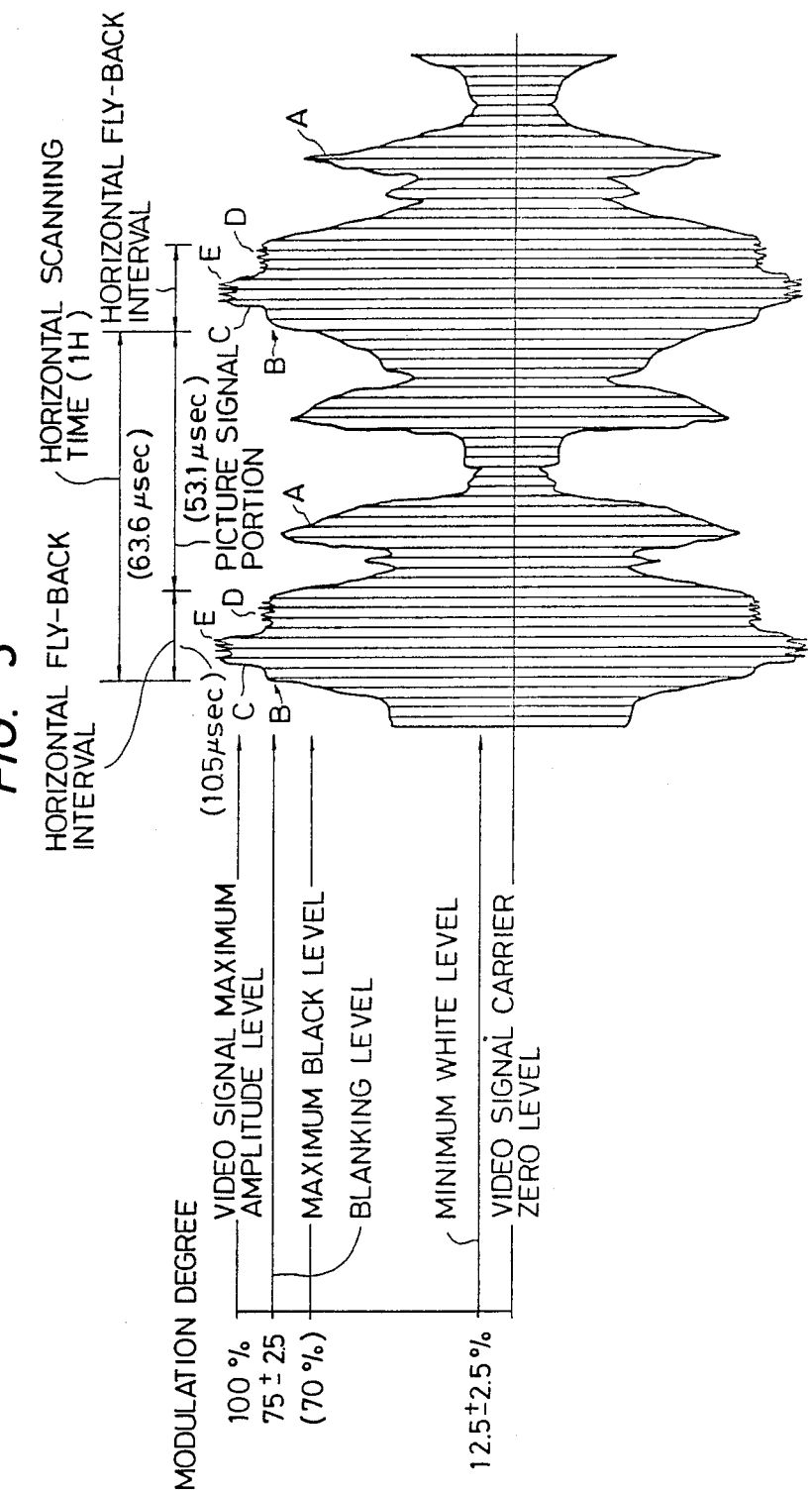
FIG. 3 shows a waveform illustrating a horizontal synchronizing signal added to descrambling key signals.

FIG. 3 shows a scrambling method according to the present invention, indicating a waveform with the addition to the video signal of an address signal containing a key and an address signal for descrambling (a key and an address signal make a data signal), and at the horizontal section of the horizontal synchronizing signal in the video signal is added a data signal E consisting of a key and an address signal. The data signal E is overlapped over only those horizontal synchronizing signals in a specific range in a certain frame, more specifically the horizontal synchronizing signals from 16L to 148L, of which from 18L to 148L are address signals. Signals 16L and 17L are exempted from the scrambling process by means of level compression as shown in FIG. 2, but predetermined areas in the horizontal synchronizing signals of 18L and thereafter are subjected to level compression and are regarded to have been provided with level compression in the form wherein the address signals are overlapped on the horizontal synchronizing signals.

Figure 4:
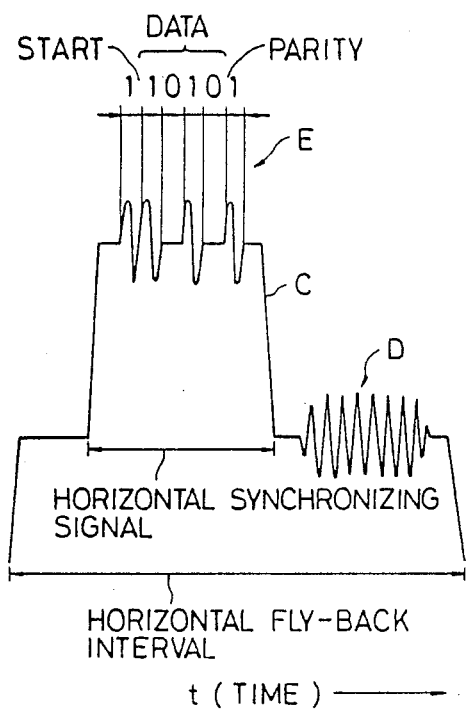
FIG. 4 shows an enlarged waveform of a portion of the horizontal synchronizing signal of FIG. 3.

FIG. 4 shows an enlarged horizontal flyback line section of FIG. 3, with the data signal E, being a digital code of 6 bits, added to the flat section on top of the horizontal synchronizing signal C. This data signal E defines the first bit in the six as the start bit; the bits from the second to the fifth, the data bits; and the 6th bit, the parity bit. The start bit here indicates the beginning of data, and the parity bit is used for checking a bit error in the data. These data bits indicate the condition of scrambling currently under way, and will also be used as keys when descrambling will take place, as well as being address codes for terminal equipment 28, and will be used as instructions to permit the reception of pictures. Reception by the TV sets 11 of scrambled video signals as transmitted with level compression performed on these horizontal line sections prevents the synchronizing separator circuits in the TV sets 11 from separating horizontal synchronizing signals C, thus failing to synchronize the reproduced pictures, resulting consequently in garbled pictures. Upon descrambling, on the other hand, only the horizontal retrace line sections processed through level compression are brought back to the original level of the video signals, so that the synchronizing signals can be separated, resulting in pictures normally demodulated. Because no treatment was performed on the picture signal portions of the video signals treated in the scrambling process, no noise or distortion takes place in the reproduced pictures through demodulation, making possible the reception of pictures of as high quality as those of ordinary TV programs not processed through scrambling and descrambling.

The destruction caused to the transmitted pictures is explained hereunder with reference to FIG. 5.

Figure 5A:
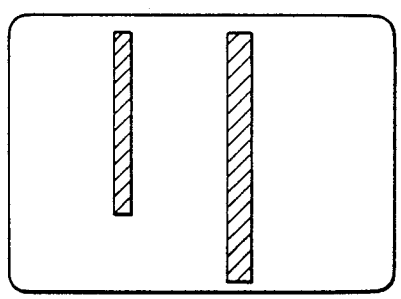
FIGS. 5(a) and (b) illustrate the state of destruction of a picture in accordance with the present invention.
Figure 5B:
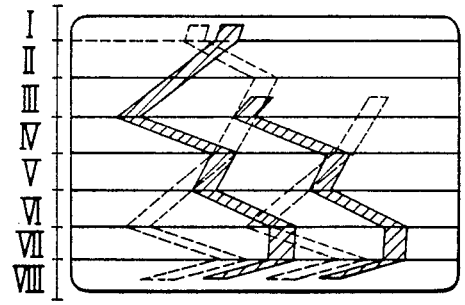

FIG. 5(a) shows schematically a normal picture before the scrambling process; FIG. 5(b) shows an example of pictures reproduced by a TV set 11 upon reception of video signals processed through scrambling, as received. In the scrambling method of an embodiment according to the present invention a picture frame is vertically divided into eight sections (not equally in this embodiment), and each section is reproduced in a manner reflecting whether the horizontal flyback line section (the portion C in FIG. 2) was subjected to level compression, so that horizontal synchronizing signals C in some sections are subjected to level compression but others are not. As a consequence, portions with the horizontal flyback line sections subjected to level compression and those which have not coexist within one picture. Those portions with the horizontal flyback retrace line section having been subjected to level compression are not synchronized, so that portions of the picture flow in a lateral direction, making the picture unrecognizable as a whole. Whether or not the provision of level compression of the horizontal flyback line section is effected in each section from I to VIII, respectively, in a picture frame divided into eight parts is determined by random number information, so the decision is not always the same. The random numbers that determine those horizontal retrace line sections to be subjected to level compression are periodically (at very short intervals) changed, so that no scrambling setting in an identical condition takes place continuously. Consequently, the scrambling process causes pictures in a given section to be continuously unstable on the TV screen, and pictures reproduced without descrambling are as indicated by the broken lines in FIG. 5(b), flowing in a disturbed picture changing upon switching of the random numbers, causing the picture to move continuously. Therefore, the pictures, even if still originally, keep varying violently on the TV screen, disturbed to the extent so as to be unwatchable as they are, if reproduced in the scrambled condition. Information as to the horizontal retrace line sections having been subjected to level compression in sections I-VIII is transmitted to the terminal equipment 28 by means of the data bits overlapped on 16L and 17L shown in FIG. 4, and the reading out of this data enables the decoder to initiate descrambling. In the meantime, the respective data bits overlapped on horizontal synchronizing signals from 18L to 148L are address signals intrinsic to respective terminal equipment units 28, by which only respective terminal units 28 corresponding to the address signals are permitted to receive pictures of that TV program with the help of the key signals for descrambling in aforementioned positions 16L and 17L. On the contrary, those terminal units 28 not receiving corresponding address codes by the address signals remain suspended functionally from receiving pictures, making watching that TV program impossible.

Dividing a picture frame into eight sections is merely an example and the division may be freely set to any proper value, for example, four or sixteen.

Figure 6:
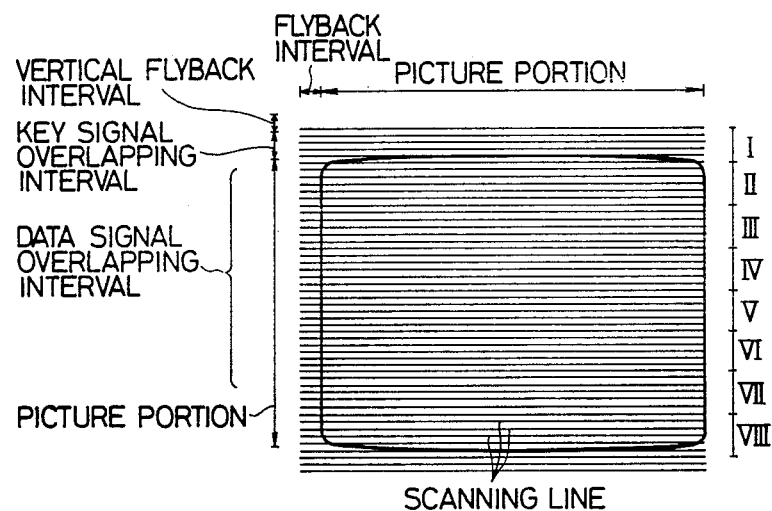
FIG. 6 illustrates the sections to be destroyed of the picture.

FIG. 6 schematically shows the relationship between the video signals and the pictures on the TV screen. Some of the scanning lines produced by the video signals do not appear on the receiver, and these are represented by a dozen or so horizontal scanning lines hidden above the screen F and forming a vertical flyback line section, those horizontal scanning lines before (those horizontal flyback)and behind thereof, and line sections of respective scanning lines hidden beyond the left hand side of the TV screen F. To some horizontal synchronizing signals C immediately after the vertical flyback line section in the video signals are added the aforementioned key signals E. To the vertical flyback line sections and the parts to which the key signal is added, there is provided no level compression for scrambling at all. Thus these signals are constructed so as to allow the horizontal synchronizing signals c to be separated together with the key signals E in order to make it possible to readily recognize the key signals for descrambling contained in the horizontal synchronizing signals. Other picture portions excepting the part with vertical flyback line sections and added key signals, as aforementioned, are divided into eight sections, and each of them is determined by a random number whether to be subjected to level compression between horizontal flyback line sections or be left as it is. The key signals E added to the horizontal synchronizing signals C in several scanning lines containing video information and immediately after the aforementioned vertical flyback line section discriminate those portions that have been provided with "graysync" depending on the level, for example, with "0" and "1" meaning "without level compression" and "with level compression", respectively, and provide expansion with the horizontal flyback line section in the portion corresponding to the signal "1" to enable the TV set to separate the horizontal synchronizing signal C. Providing these scrambling processes in sequence with respective fields demodulates a picture into a normal state. With the horizontal synchronizing signals C for more than one hundred scanning lines containing video information and beginning immediately after the aforementioned key signal overlapping section are overlapping address signals that direct respective corresponding terminal units 28, by means of address codes assigned to respective terminal units 28, with classification provided therewith by predetermined areas, and the horizontal synchronizing signals C containing these address signals are provided with level compression or left unchanged depending upon the aforementioned random number signals.

Now, a exemplitive embodiment according to the present invention will be explained hereunder with respect to FIG. 7 et. seq.

Figure 1:
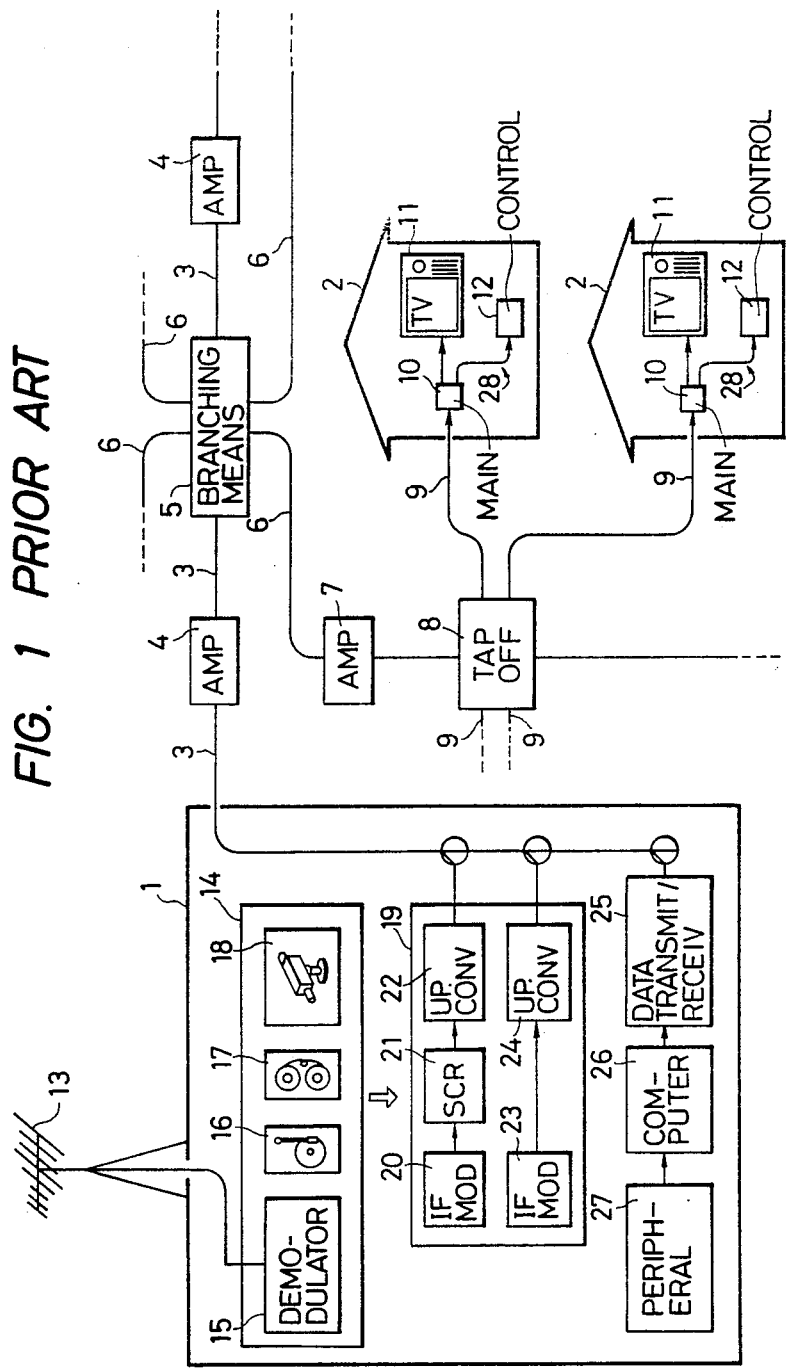
FIG. 1 is a schematic drawing showing a conventional CATV system.
Figure 7:
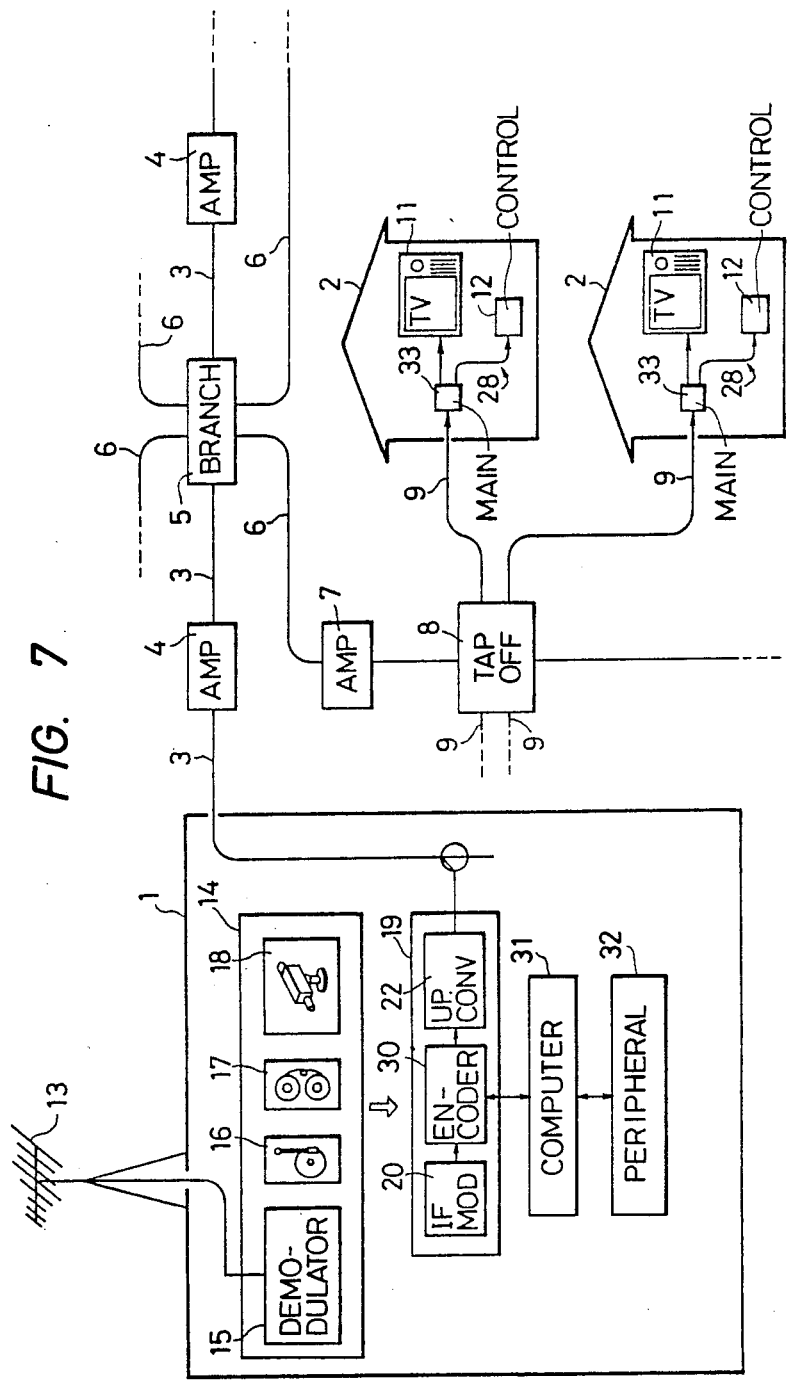
FIG. 7 is a schematic drawing showing an exemplary embodiment applied to a CATV system.

FIG. 7 shows an exemplary embodiment of the scrambling system according to the present invention as applied to a CATV system, wherein the identical components to those in FIG. 1 have identical reference numbers for the purpose of avoiding duplication in description.

Between an IF modulator circuit 20 and an up converter circuit 22 is provided an encoder 30 for scrambling. Provided as well in the center 1 is a computer 31 that generates key signals and address signals. The computer 31 is connected to a peripheral device 32 that carries out entering/cancelling data, etc. Between a sub-branch cable 9 and a TV set 11 are provided a main box 33 with a built-in decoder, and to this main box 33 is connected the control box 12.

Figure 8:
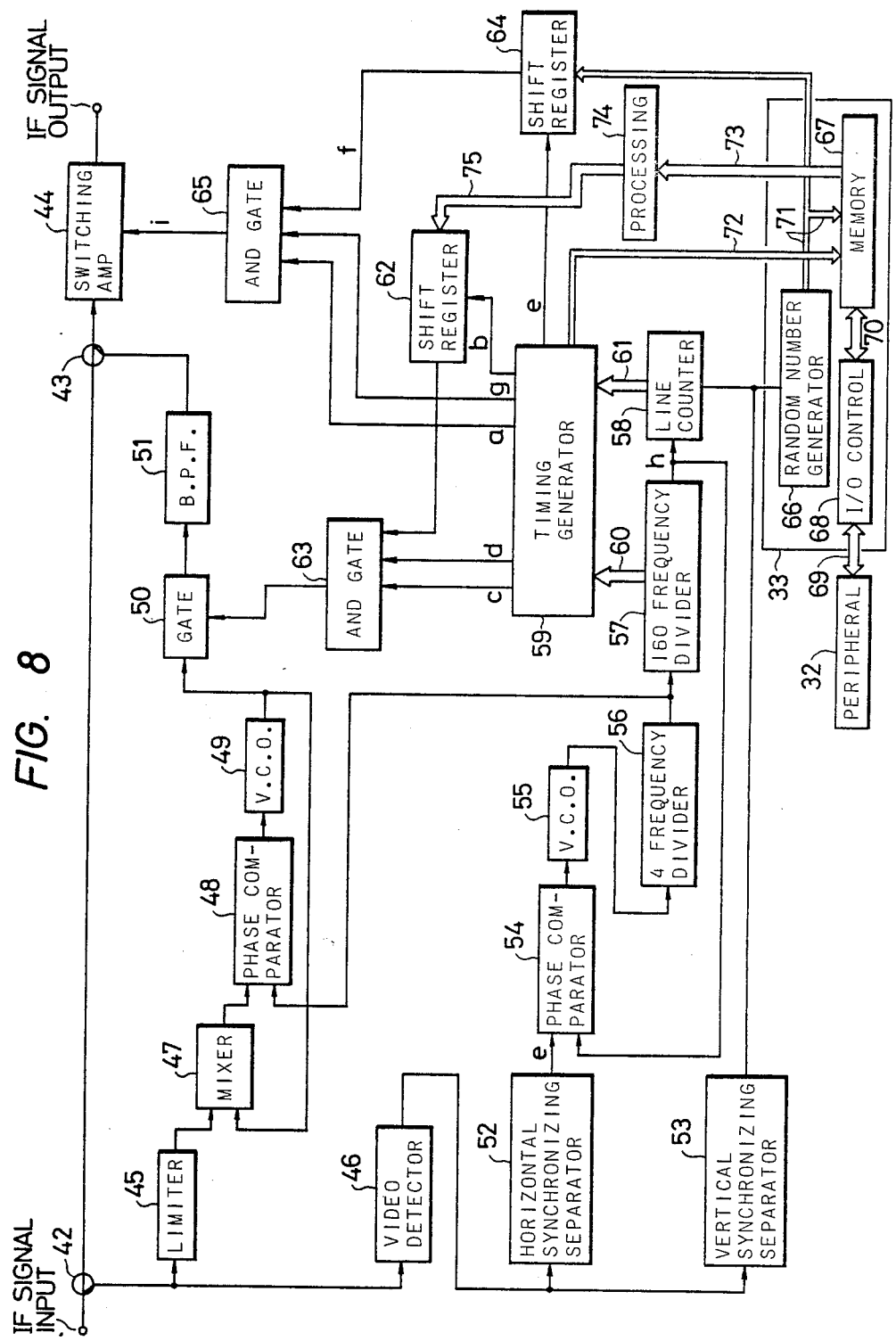
FIG. 8 is a block diagram for the encoder used in the exemplary embodiment.

FIG. 8 shows the interior structure of the aforementioned encoder 30. The IF signals enter through a branching unit 42 and are transmitted through the medium of a coupling unit 43 and a switching amplifier circuit 44. To a terminal branched from the branching unit 42 are connected a limiter circuit 45 and a video detector circuit 46, and to the limiter circuit 45 is connected a mixer circuit 47. Outputs from the mixer circuit 47 enter a phase comparator circuit 48 (incorporating a low pass filter); and outputs from the phase comparator circuit 48 enter a VCO 49. The output of the VCO 49 is connected to the other input terminal of the mixer circuit 47, and the mixer circuit 47, phase comparator circuit 48 and VCO 49 form a PLL. Outputs from the VCO 49 enter the coupling unit 43 through the medium of a gate circuit (switching circuit) 50 and a band pass filter 51. Outputs from the aforementioned video detector circuit 46 enter horizontal synchronizing separator circuit 52 that functions to separate horizontal synchronizing signals from the video signals, and a vertical synchronizing separator circuit 53 which functions to separate vertical synchronizing signals. The horizontal synchronizing separator circuit 52 is connected to one input terminal of a phase comparator circuit 54 (incorporating a low pass filter), and outputs therefrom enter a VCO 55, a 4-frequency divider circuit 56 and a 160-frequency divider 57 in this order. Outputs from the divider circuit 57 enter a line counter circuit 58 and the other input terminal of the aforementioned phase comparator circuit 54, respectively. Outputs from aforementioned vertical synchronizing separator circuit 53 enter the line counter 58. Numeral 59 represents a timing generator circuit that delivers timing signals for controlling the timing of every part of the encoder 30, and this timing generator circuit 49 receives counter outputs 60 from the 160-divider circuit (which consists of plurality of flipflops, and each flipflop is capable of generating outputs, respectively) 57 and counter outputs from the line counter circuit 58. Outputs "b" from the timing generator circuit 59 enter a shift register circuit 62; outputs "c" and "d" from the timing generator circuit 59 and outputs from the shift register 62 enter an AND gate 63; outputs from the AND gate 63, as control signals enter the gate circuit 50; and outputs "e" from the timing generator circuit 59 enter the shift register circuit 64. Outputs "a" and "g" from the timing generator circuit 59 and outputs "f" from the shift register 64 enter the AND gate 65, respectively; outputs "i" from the AND gate 65, as control signals enter the switching amplifier circuit 44. In aforementioned computer 33 are provided a random number generator circuit 66 that generates, upon receiving control signals, 8-bit, random numbers; a memory circuit 67 for storing address codes for terminal units 28 that permit receiving pictures; and an input/output control circuit 68. The peripheral equipment 32 that deals with data input and the input/output control circuit 68 is connected by means of a data bus 69; the memory circuit 67 and the input/output control circuit 68, by a data bus 70. Random number outputs 71 from the aforementioned random number generator circuit 66 enter the shift register circuit 64 and the memory circuit 67; timing outputs 72 from the aforementioned timing generator circuit 59 enter the memory circuit 67; memory signals 73 from the memory circuit 67 enter a processing circuit 74; and processed memory signals 75 from the processing circuit 74 are input to the shift register circuit 62.

Figure 9:
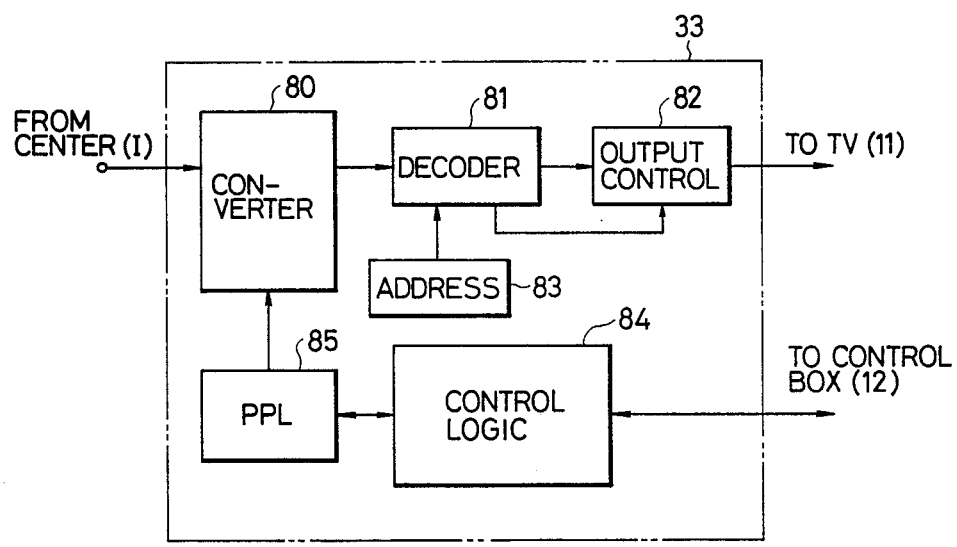
FIG. 9 is a block diagram showing the interior construction of the main box.

FIG. 9 shows the interior of aforementioned main box 33 in FIG. 7, wherein the sub-branch cable 9 connects inside the main box 33, to a converter 80 for frequency conversion, outputs from the converter 80 are defined to be for a specific channel (for example, channel 2), outputs from this converter 80 reach the decoder 81 functioning for descrambling, and the decoder 81 is connected to the TV set 11 shown in FIG. 9 through an output control unit 82. To the decoder 81 is connected an address section 83 that defines addresses for the terminal equipment 28 for the decoder 81, and control signals, i.e., the results of analysis carried out by the decoder 81, enter the output control unit 82. The control box 12 for selecting a channel for receiving pictures therethrough connects, inside the main box 33, to a control logic unit 84, and signals for selection of channels from the control logic unit 84 connect to the aforementioned converter 80 by the medium of a PLL unit 85 for stabilization of frequency.

Figure 10:
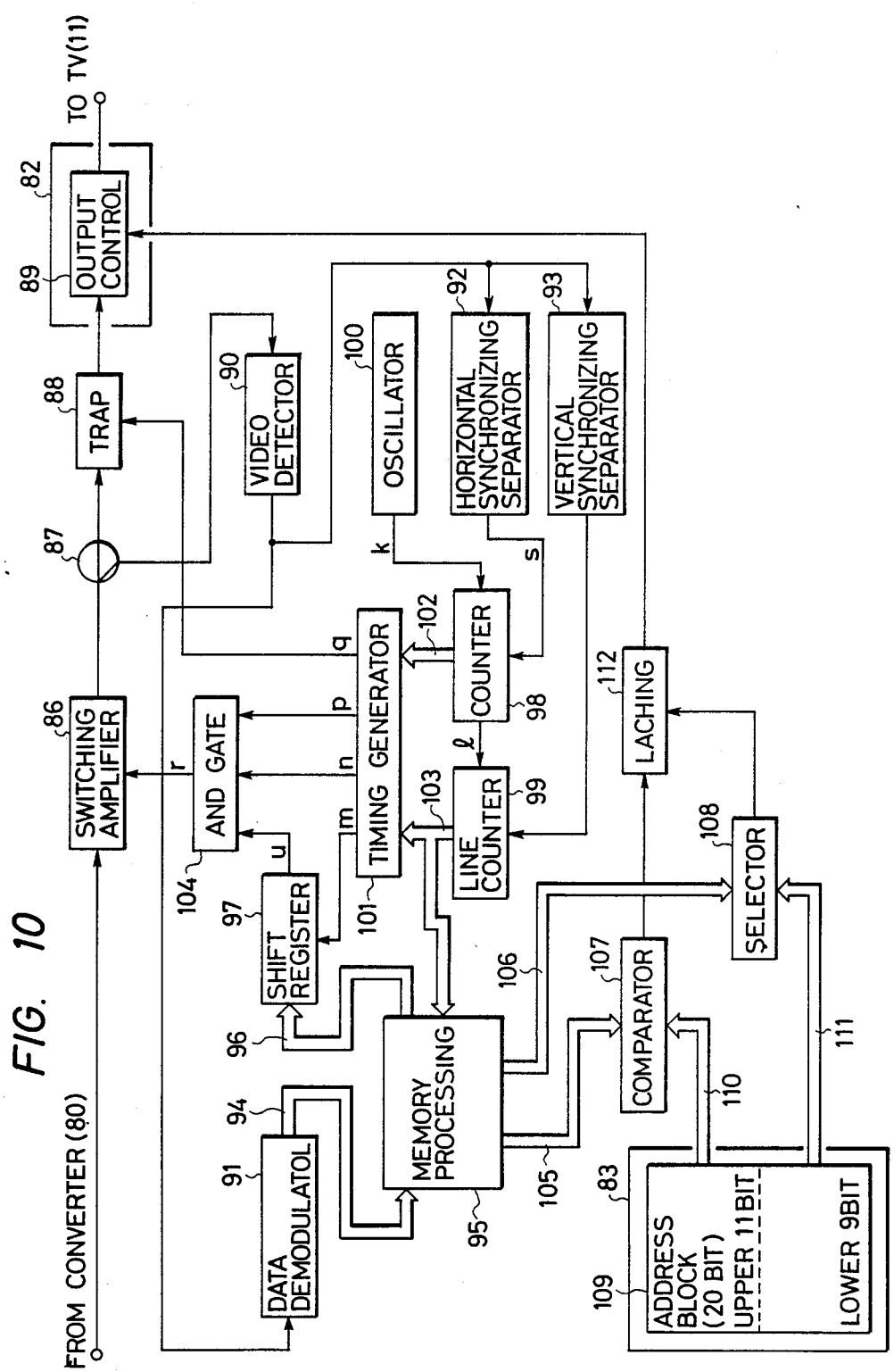
FIG. 10 is a block diagram showing the decoder construction of the main box.

FIG. 10 shows in detail the interior structure of the decoder 81 in FIG. 9. Video signals (including sound signals) from the converter 80 connect to the TV set 11 through the medium of the switching amplifier circuit 86 capable of varying the amplification degree in two steps, a branching unit 87, a trapping circuit 88, and an output control circuit 89 in the output control unit 82. Signals branched by the aforementioned branching unit 87 enter a video detector circuit 90; and outputs from the video detector circuit 90 reach a data demodulator circuit 91, a horizontal synchronizing separator circuit 92, and a vertical synchronizing circuit 93. Data outputs 94 from the data demodulator circuit 91 enter a memory processing circuit 95, and key signal outputs 96 from the memory processing circuit 95 connect to a shift register circuit 97. Outputs from the aforementioned horizontal synchronizing separator circuit 92, as reset signals, and outputs from the vertical synchronizing separator circuit 93, as reset signals, enter line counter circuits 98 and 99, respectively. Numeral 100 represents an oscillator circuit, using a crystal control oscillator, capable of generating a stable frequency of 160 times (about 2.5 MHz) the horizontal synchronizing frequency. Outputs from the oscillator circuit 100 enter the counter circuit 98 and signals 1 synchronously counted by and generated from the counter circuit 98 enter the line counter 99. Numeral 101 represents a timing generator circuit forming timing signals for controlling every part of the decoder 81. The timing generator circuit 101 receives counter outputs 102 and 103 from the counter circuit 98 and the line counter circuit 99, respectively. Outputs 103 from the line counter circuit 99 also enter the aforementioned memory processing circuit 95. Signals "m" from the timing generator circuit 101 enter the shift register circuit 97; output "u" from the shift register circuit 97 and signals "n" and "p" enter an AND gate circuit 104; outputs from the AND gate circuit enter the switching amplifier circuit 86; and signals "q" from the timing generator circuit 101 are fed to the trap circuit 88. The aforementioned memory processing circuit 95 separates address codes (in 20 bits), analyzing data signals contained in horizontal synchronizing signals, and transmits the upper 11 bits out of the address code as group outputs 105; and the lower 9 bits as personal outputs 106. The group outputs 105 enter a comparator circuit 107; the personal outputs 106, a selector circuit 108. In aforementioned address unit 83 is provided an address block 109 wherein are electronically set addresses, the numbers inherent to respective terminal units, the address block 109 consisting of 20 bits (capable of producing address numbers for 1,048,576 terminal units 28), and the upper 11 bits generate group address outputs 110; the lower 9 bits, personal address outputs 111. These group address outputs 110 enter the comparator circuit 107; the personal address outputs 111, the selector circuit 108. Outputs from the comparator circuit 107 enter a latching circuit 112; outputs from the selector circuit 108 are, as latching signals, transferred to the latching circuit 112; outputs from the latching circuit 112, as control signals, enter the aforementioned output control circuit 89.

The operations of this exemplary embodiment according to the present invention are explained hereunder.

Firstly, the exemplary embodiment is outlined in relation with FIG. 7. Video signals from the IF modulator circuit 20 entering the encoder 30 are so processed therein that it will not be possible to reproduce normal pictures from them as received, and the signals are modulated by the up converter 20 to a frequency for a certain channel. At the terminal unit 28, the decoder 81 in the main box 33 demodulates and analyzes the key signals for descrambling delivered together with the video signals from the center 1, and descrambles the scrambled video signals in accordance with the key signals to demodulate them into normal video signals.

On the other hand, the computer 31 transmits address codes to grant permission for receiving pictures together with key signals in scrambled random numbers, these address codes are transmitted, following the key signals, to the terminal unit 28 upon being overlapped by the encoder 30 on the video signals. In the main boxes 33 belonging to the terminal units 28 are separated and analyzed these address signals and when they match the address numbers preset to respective applicable terminal units 28, these terminals are cleared to receive pictures enabling the main boxes 33 to supply the TV sets 11 with descrambled signals.

The encoder 30 takes two actions: one is to provide specific horizontal synchronizing signals with level compression; and the other is to provide specific horizontal synchronizing signals with added key signals for descrambling.

In FIG. 8, the video signals entering the IF modulator circuit 20 (IF input) pass through the branching unit 42 and the coupling unit 43 and are then amplified to a selected amplification degree (to a lower amplification degree than normal only when control signals from the timing generator circuit 59 have been delivered) of the two of the switching amplifier circuit 44, and are entered as IF outputs of the scrambled video signals into the up converter 22. Part of video signals branched by the branching unit 42 lose their portions that have been AM modulated, caused by the limitation applied to their amplitude by the limiter circuit 45, and only video carriers enter the mixer circuit 47 to be mixed with the outputs from the VCO 49; the outputs, upon entering the phase comparator circuit 48, stabilize the oscillation frequency of the VCO 49 (a PLL circuit is formed of mixer circuit 47, phase comparator circuit 48 and VCO 49). The oscillation wave of the outputs from the VCO 49 is a little lower (about 47.75-2.5 MHz) than that of the video carriers from the limiter 45 (45.75 MHz), and to the mixer circuit 47 are transmitted the difference between these input frequencies as a beat frequency (about 2.5 MHz), the beat frequency being transmitted to the phase comparator circuit 48. The phase comparator circuit 48 receives the output, to be used as a reference, from the 4-frequency divider circuit 56 (about 2.5 MHz, 160 times the horizontal synchronizing frequency). The outputs from the 4-frequency divider circuit 56 are of the frequency as derived from multiplying the frequency of the horizontal synchronizing signal by an integer; the phase comparator circuit 48 operates so that the phase matches the output signals from the 4-frequency divider circuit 56; the beat frequency from the phase comparator circuit 48 is provided with phase locking and is then fed back to the VCO 49. Consequently, the outputs from the VCO 49 are lower in frequency by a prescribed number than that of the video carriers, and this beat frequency is provided with phase locking to the reference signal by the horizontal synchronizing signals, so that it is secured with its phase stabilized to the oscillating frequency. The frequency of the VCO 49 becomes the subcarrier to the digital data signal added to the horizontal synchronizing signals, and the outputs from the VCO 49 enter the gate circuit 50. The video signals from the branching unit 42 are detected by the video detector circuit 46 and are then transmitted to the horizontal synchronizing separator circuit 52 and the vertical synchronizing separator circuit 53, in the form of a signal waveform for amplitude variation. Being separated in the respective circuits 52 and 53, horizontal synchronizing signals enter the phase comparator circuit 54, while vertical synchronizing signals enter the line counter circuit 58, as the reset signals. Outputs from the aforementioned comparator circuit 54 enter the VCO 55; outputs from the VCO 55 (at a frequency of about 10 MHz) enter the phase comparator circuit 54 through the medium of the 4-frequency divider circuit 56 and the 160-frequency divider circuit 57; the phase circuit 54, by detecting deviations between the horizontal signals and outputs from the VCO 55, provides oscillation waves matching the phase of the horizontal synchronizing signals (phase locking by means of PLL). The oscillation frequency of the VCO 55 is a frequency of 4×16 times (about 10 MHz) the horizontal synchronizing signal interval A (63.6 μ sec.); the oscillating wave of the VCO 55 being at a frequency of about 2.5 MHz, as a result of division provided by the 4-frequency divider circuit 56, is entered into the phase comparator circuit 48. The phase comparator circuit 48 provides, as well, matching of the phase of the beat frequency formed by outputs from the VCO 49 and the video carrier. That is, the horizontal synchronization signals contained in the video carriers allow the phase of the VCO 55 and the phase of the beat frequency formed by outputs from the VCO 49 and the video carriers to be in complete matching. Outputs from the 160-frequency divider circuit 57 and the line counter circuit 58 are by counter outputs 60 and 61, respectively entered into the timing generator circuit 59; and the timing generator circuit 59 generates timing signals that direct actions of the encoder 30. The random number generator circuit 66 generates an 8-bit pseudo random number every time (one time for one field) the signals enter from the vertical synchronizing separator circuit 53, and transmits that random number signal, as a random number output 71, to the shift register circuit 64 and the memory circuit 67. As a result, the shift register circuit 64 and the memory circuit 67, respectively, store new random numbers for one field of the picture and transmit the stored random numbers, as key signals, as directed by the timing outputs 72 and the signal "e". In the memory circuit 67 are stored, through the medium of the input/output control unit 68, the address codes entered by the peripheral equipment 32; these address codes remain stored unless corrected or cancelled by the peripheral equipment 32, being arranged in order beginning with the lowest number. The memory circuit 67, in accordance with the timing outputs 72 entered, transmits stored random number signals, as key signals, at first and then the address codes, as address signals, in sequence to the processing circuit 74. The memory signals 73 containing key and address signals transmitted from the memory circuit 67 to the processing circuit 74 are processed through the processing circuit 74 whereby a memory signal 73 is sectioned at every fourth bit and each section is added with a start bit at the leading end and with a parity bit at the trailing end, thus being formed into processed memory signals 75 to be transmitted to the shift register circuit 62. In the meantime, the shift register circuit 64, in accordance with the instructions entered by means of the signals "e", transmits, one bit at a time, the 8-bit random numbers stored therein for each one of the eight divided sections of the picture frame.

Figure 11:
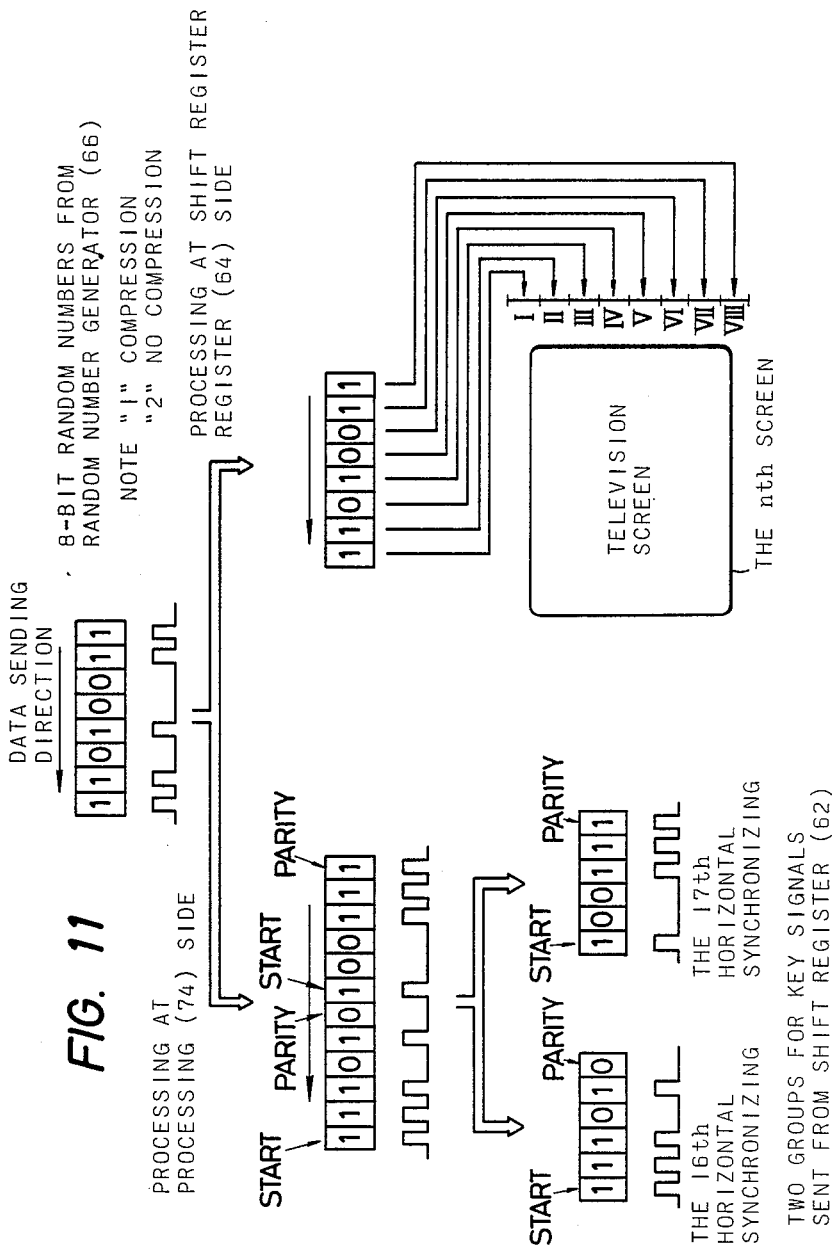
FIG. 11 illustrate the use of random numbers and the processing thereof.

FIG. 11 shows schematically the relationships and the differences in the actions of the random number generator circuit 66, the memory processing circuit 74 and the shift register circuit 64.

The random number generator circuit 66 generates 8-bit random numbers; a random number consists of a combination of "1" and "0" bits. "1" means that the horizontal flyback line section is to be subjected to level compression, and "0" means that no compression is required, with the horizontal flyback line section left in its original condition. A random number entering the processing circuit 74 through the memory circuit 67 is divided into 4-bit sections followed by processing each one of the resultant 4-bit sections to be of 12-bits with the addition of start and parity bits on the leading and trailing ends, respectively, and these 12-bit signals enter the shift register circuit 62 in sequence. The shift register 62, in accordance with the signals "b", transmits each processed 12-bit random number two times, with six bits at a time. The shift register circuit 64, on the other hand, stores 8-bit random numbers as they are, and transmits them one bit at a time in accordance with the signal "e", and each bit is assigned to each section of a TV screen divided into eight portions so as to define whether or not the horizontal flyback line section of each section is subjected to level compression.

Signals "a", "b", "c", "d", "e", and "g" generated by the timing generator circuit 59 and timing outputs 72 enable the switching of outputs from the AND gates 63 and 65 to "1" or "0" to allow the switching amplifier circuit 44 to destroy parts of the picture designated by a random number, and at the same time, enable the gate circuit 50 to overlap key signals for descrambling over the horizontal synchronizing signals.

Figure 12:
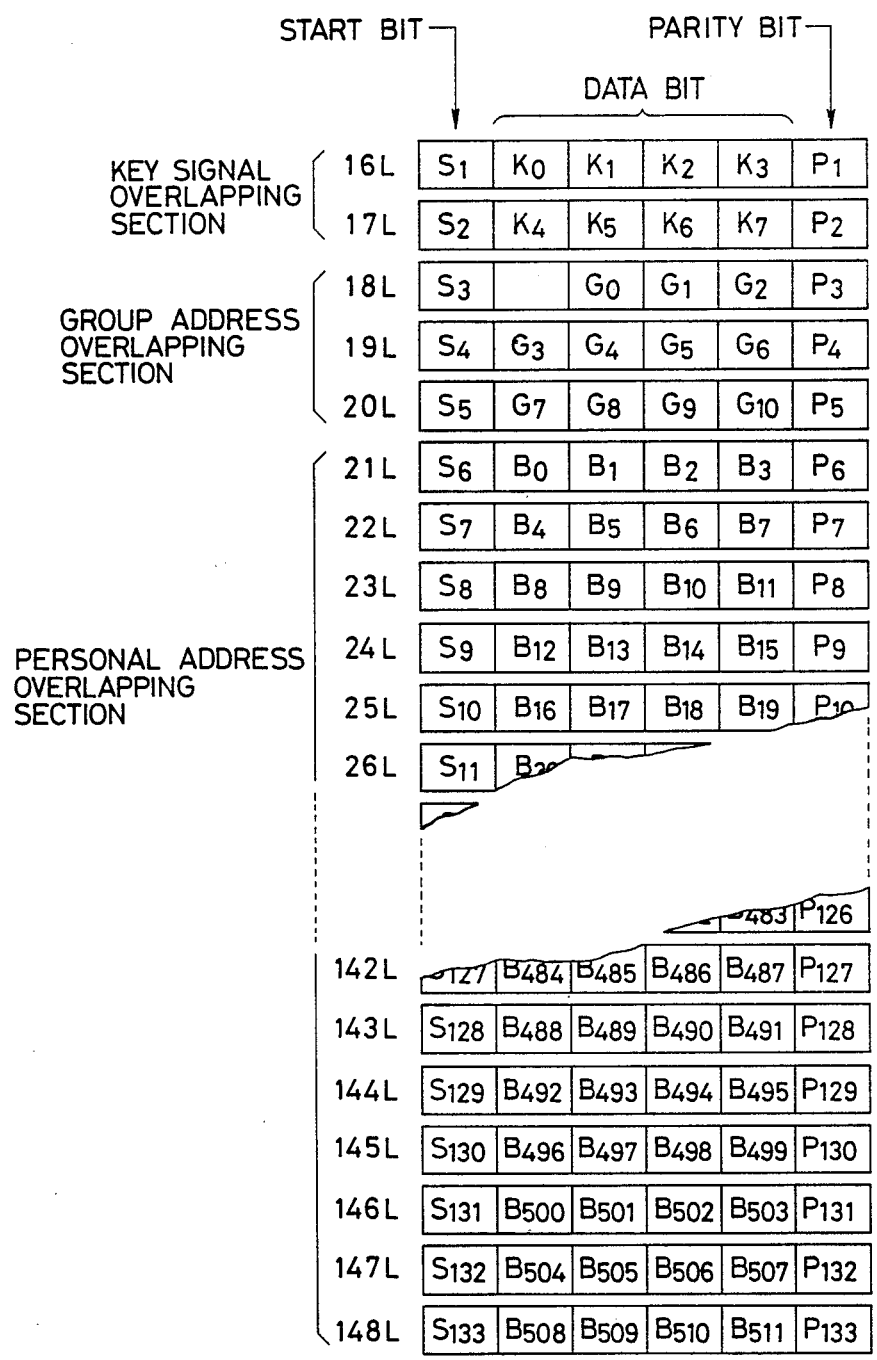
FIG. 12 schematically shows the order of data for the overlapping of data signals on each horizontal synchronizing signal, at the decoder.

FIG. 12 schematically shows the positions and contents of data signals overlapping on one field of a video signal.

Over horizontal synchronizing signals 16L and 17L (L: horizontal synchronizing signal) in this field are overlapped an 8-bit key signal, while over 18L–20L are overlapped the upper 11 bits of an address signals, as an address code, and on 21L–148L are overlapped the lower 9 bits of an address signal, as a personal address signal, upon being matched to each step. A signal overlapping each horizontal synchronizing signal will be added with a start bit and a parity bit at leading and trailing ends thereof, resulting in an entire 133L being overlapped by 6-bit signals. The overlapping of key signals with 16L and 17L is carried out in the same way as shown in FIG. 11, and 11-bit group address signals are overlapped with the 12-bit data areas in 18L–20L, with the first data bit in 18L being blank. For the group address signal are used the upper 11 bits of a 20-bit address code, so that, if the address code, for example, is "11010101011100111101", the group address signal is "11010101011", and this signal therefore corresponds to from $G_0$ to $G_{10}$ in sequence. The personal address signal contains 512 bit areas from $B_0$ to $B_{511}$ and these areas are set so that each bit corresponds to one terminal unit 28. If the signal for a bit corresponding to a terminal unit 28 is "1", permission is granted for receiving pictures (ENABLE), and "0" indicates rejection (DISABLE), so as to constitute a viewing command. Consequently, from the fact that the lower 9 bits of the aforementioned address signal are "100111101", these lower 9 bits correspond to the 317th area of those set in the 512 addresses, so that B316 is the address for said terminal unit 28. If the bit for B316 is "1", it allows the receipt of pictures, but it if is "0", reception is not possible.

The actions of parts of the encoder 30 actuated by the timing generator circuit 59 include the following three different actions:

(A) Assignment of the level compression process to the horizontal retrace section of a portion sectionalized on the picture of one field.

(B) Addition of key signals into the horizontal synchronizing signals.

(C) Addition of address signals for picture reception ENABLE/DISABLE into the horizontal synchronizing signals, following the key signals.

(D) Providing level compression of horizontal synchronizing signals in specific areas on a picture so designated by random numbers.

These actions proceed in parallel, and are explained hereunder with reference to timing charts.

Figure 13:
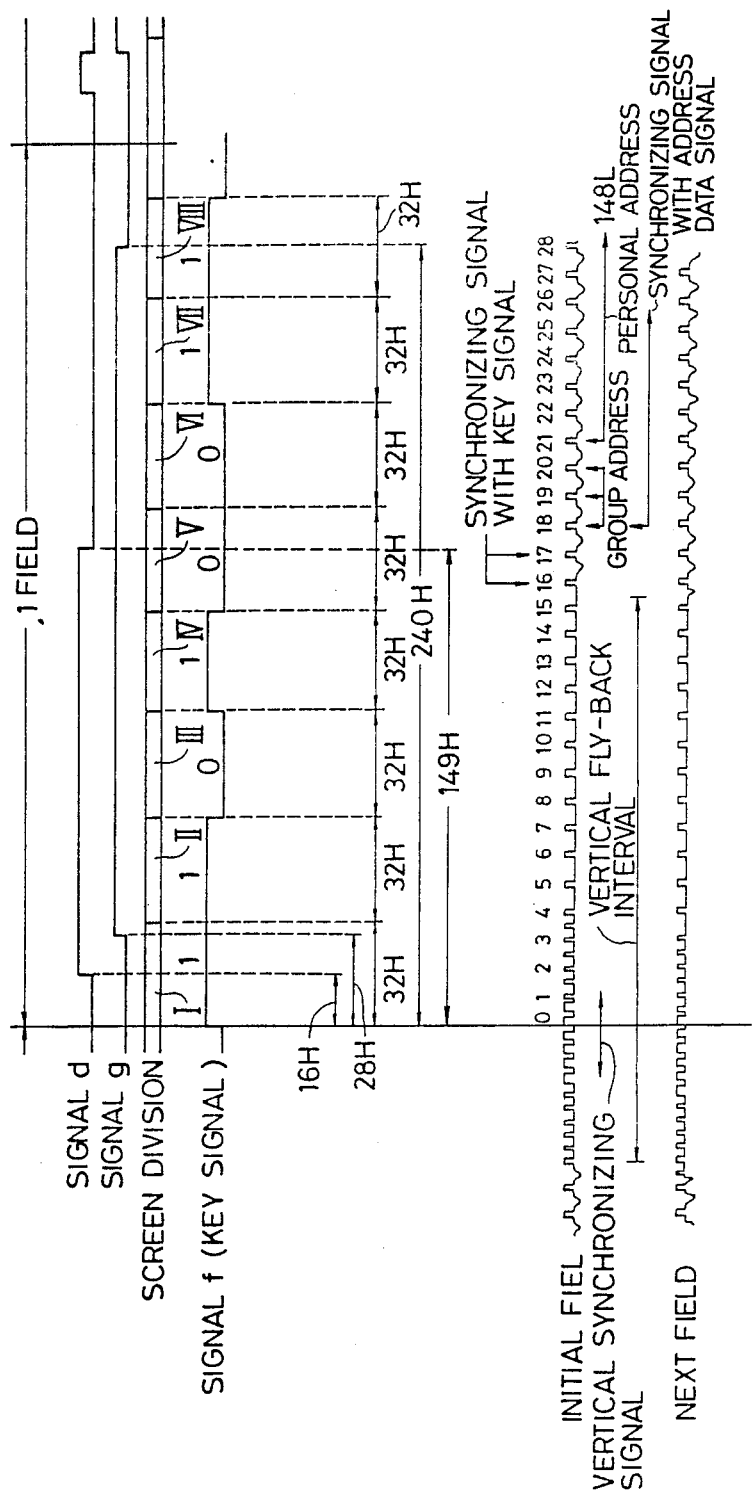
FIG. 13 is a timing chart showing the changes in signals at each part of the encoder, in one field, and the relationship of the video signals thereto.

(A) Assignment of the level compression process to the horizontal flyback section:

FIG. 13 shows the timing of each signal in one field; the upper part indicates areas of the picture frame divided into eight and the signals "d", "f" and "g"; and the lower part, a video signal. Timings at the upper and the lower parts match the timing for the start of the field. The video signal in the lower part, however, is enlarged.

(1) Start of counting by the vertical synchronizing signal

The vertical synchronizing signal from the video detector circuit 46 enters the vertical synchronizing separator circuit where it is separated, and the 3rd H from the leading edge of the vertical synchronizing signal (H: horizontal synchronizing period) resets the line counter circuit 58, and, at the same time, allows the random number generator circuit 66 to generate new random numbers. From this instant, the line counter circuit 58 starts counting divider outputs delivered by the 160-frequency divider circuit 60.

(2) Division of the field:

Then, the horizontal synchronizing period H is counted when the line counter circuit 58 has begun counting, by which the field is divisioned into 8 sections I-VIII, at every 32nd H.

(3) Generation of the signal for scrambling:

8-bit random numbers generated by the random number generator circuit 66 enter the shift register circuit 64, which, in turn, transmits, in accordance with the instructions of the signal "e", the random number signals, as signals "f", by sections I-VIII. These are transmitted as, for example, "1, 1, 0, 1, 0, 0, 1, 1" as shown in FIG. 11, where each signal "1" or "0" corresponding to each of the 8 sections is transmitted one by one with its timing in synchronism. When this signal "f" is "1", the horizontal flyback line section at this timing is provided with level compression, but, if the signal "f" is "0", the horizontal flyback line is not processed at all, thus being transmitted as it is.

(4) Period of addition of the data signal:

While the line counter circuit 68 is counting the horizontal synchronizing period H, as aforementioned, the horizontal synchronizing signals at every horizontal synchronizing period H are numbered, providing the one at the time of line counter circuit 58 reset with the number "0". Each number is indicated by an L. The L numbers for the horizontal synchronizing signals counted by the line counter 58 are transmitted to the timing generator circuit 59.

The timing generator 59 transmits to the AND gate circuit 63 the signals "d" between 16L and 149L, providing them with the level "1". This enables the horizontal synchronizing signals between 16–149L to be added to scrambling key signals followed by the addition of address signals for permitting or rejecting picture reception. Addition of this key signal will be described in detail hereinafter. (Note: Data can be attached to those horizontal synchronizing signals at each 12 H immediately after the last vertical flyback line section. But in this exemplary embodiment, only 16L and 17L are added to key signals and address signals are attached to those between 18L–149L.)

(5) Control of the scrambling of the video signal:

Only for those horizontal synchronizing signals in between 28L and 239L, is the signal "g" at "1", and these signals are supplied to the AND gate circuit 65. Therefore, when the signal "g" is "0", outputs from the AND gate circuit 65 are always "0" without regard to the signal "f" for level compression of the horizontal flyback line sections. Consequently, no processing at all is provided between 0–27L and from 240L thereafter, even if the signal "f" is "1", the outputs "g" from the AND gate 65 during this period being "0" enabling the reception of pictures as they are. However, as scrambling is provided for most of the pictures, it is not possible to watch these pictures in the normal condition without descrambling.

(6) Level compression of the horizontal flyback line section:

The signal "i" controlling the switching amplifier circuit 44 is supplied from the AND gate 65, but this AND gate circuit 65 is capable of generating the signal "1" only when signals "a", "f" and "g" enter therein at the same time. When these three signals have entered, the AND gate circuit 65 decreases the amplification degree of the switching amplifier circuit 44, providing level compression of the horizontal flyback line section (level compression will be explained hereinafter).

Figure 14:
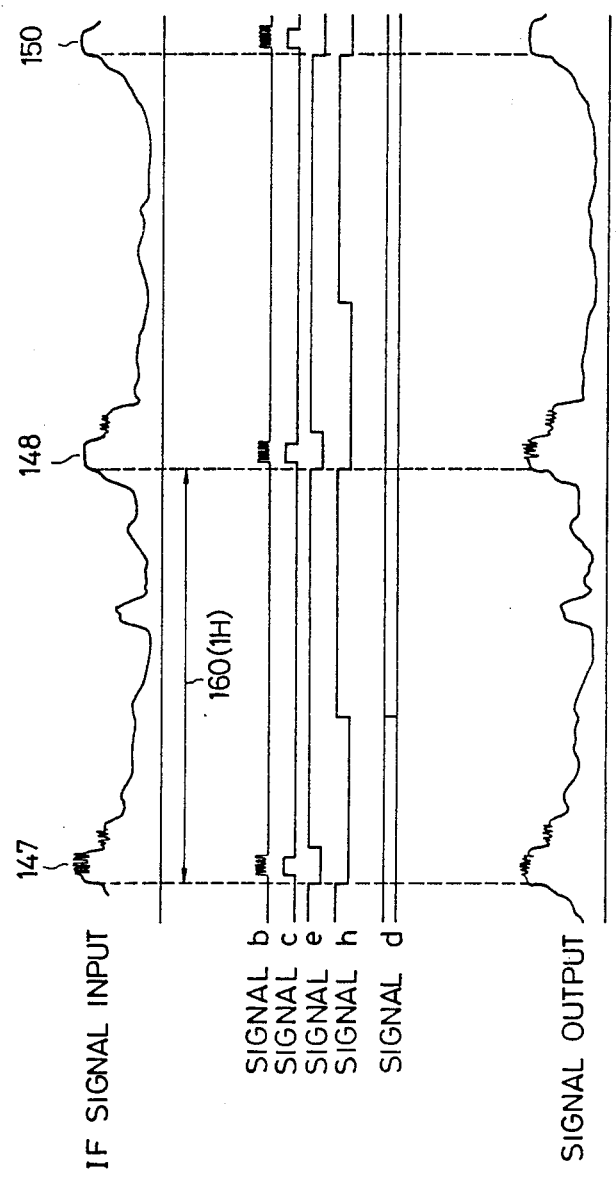
FIG. 14 is a timing chart showing changes in the signals in parts of the encoder and the state wherein the key signals are added.

(B) Addition of the key signal for scrambling into the horizontal synchronizing signal:

The encoder 30 provides a scrambling process by carrying out level compression on horizontal flyback line sections, but descrambling key signals are required in order to permit reproduction of normal pictures. FIG. 14 is a timing chart showing the process of addition of these key signals to horizontal synchronizing signals, in relation to which is explained the addition of the key signals.

The video signal at the upper portion are IF signals before entering the encoder 30; at the lower portion are shown the IF signals when they have been transmitted by the encoder 30.

In this embodiment, the space between horizontal synchronizing signals is equally divided by 160, and each signal is transmitted based on this timing with 1/160 as the reference clock.

(1) Formation of the oscillation wave for coding the data signal;

As aforementioned, a mixer circuit 47, a phase comparator circuit 48 and a VCO 49 form a PLL circuit: the phase comparator circuit 48 generates a frequency lower than the video signal carrier by about 2.5 MHz; the VCO 49 supplies it in a stable state continuously to the gate circuit 50; and the oscillation wave from the VCO 49 becomes a subcarrier for the key signals.

(2) Formation of the signal to be continuously

The timing generator circuit 59 receives clock signals based on the horizontal synchronizing signal as a reference, from the 160-frequency divider circuit 57 and the line counter circuit 58. Furthermore, the phase of the frequency of the 160-frequency divider circuit 57 is matched by the phase comparator circuits 58 and 54 with that of the oscillation wave for the VCO 49. Therefore, the timing generator circuit 59, regardless of other entering signals, generates signals "b", "c" and "h" continuously at a prescribed timing with the horizontal synchronizing signal as a reference. These signals "b", "c" and "h" rise at the trailing edge of the horizontal synchronizing signal transmitted by the horizontal synchronizing separator circuit 52, making the reference the signal "e" that becomes "0" for the period of time of 12/160 H. Firstly, the signal "b" is generated at about the center of a horizontal synchronizing signal and is used as the shift lock for the shift register circuit 62. This signal "b" is transmitted for six cycles at a clock rate having a frequency of 160 times the horizontal synchronizing frequency. The signal "c" is used for opening the AND gate 63, and remains generated during the period of time, and at the same timing as when the signal "b" is being transmitted. The signal "h" is the 160-frequency divider output from the 160-frequency divider circuit 57 and falls at the trailing edge of the horizontal synchronizing signal "e" and rises about midway of each horizontal synchronizing signal. At the leading edge of this signal "h", the line counter circuit 58 is counted up. The signals "b", "c" and "h" are generated continuously in the pattern shown.

(3) Signal generation for adding the key signals:

Key signals are not added to all the horizontal synchronizing signals, but are added to specific predetermined positions; in this exemplary embodiment, to the horizontal synchronizing signals 16L and 17L. For this purpose, the timing generator circuit 59 generates signals "d" designating the horizontal synchronizing signals to be added with key signals. This signal "d" is "1" only when specific horizontal synchronizing signals are to be added with data signals, and the timing at which it shifts to "1" or "0" is set at the time the signal "h" rises, but it does not affect the horizontal synchronizing signals. In this exemplary embodiment, the signal "d" rises at a time between the horizontal synchronizing signals 15L and 16L. Further, from the timing generator circuit 59 to the memory circuit 67 are transmitted timing outputs 72, by which the key signals in the memory are transmitted.

(4) Adding of key signals to the horizontal synchronizing signal:

As aforementioned, to the gate circuit 50 are input subcarriers from the VCO 49; to the AND gate 53, signals "c" and "d", and outputs from the shift register circuit 62; and to the shift register circuit, the signal "b". The AND gate 63 outputs a "1" when receiving the signals "c" and "d", and the output from shift register circuit 77 at the same time, but the shift register circuit 62 inputs the signals "b" in the amount of 6 cycles in sequence, and transmits key signals dispersed over every 12 bits entered from the processing circuit 74, in sequence with the timing of the signal "b". Therefore, as shown in FIG. 11, a data signal of "111010" is transmitted for the horizontal synchronizing signal 16L, to the AND gate circuit 63. The gate circuit 50, in consequence, opens or closes depending on this output of the shift register circuit 62 to transmit to the coupling unit 43 through the band pass filter 61 the subcarrier from the VCO 49 at a clock frequency of 160 times the horizontal synchronizing frequency per one bit, whereby the burst signals of the subcarrier are overlapped with the horizontal synchronizing signals, causing the envelope of the horizontal synchronizing signal to be formed as a sine wave of one bit per cycle. Thus the horizontal synchronizing signal is added with a sine wave corresponding to "111010". Likewise, the horizontal synchronizing signal 17L is provided with the data signal of "100111" as shown in FIG. 11.

(C) Addition of address signal for the ENABLE/DISABLE of picture reception into the horizontal synchronizing signal, following the key signals:

As explained in (B) above, horizontal synchronizing signals are overlapped with the key signals. Subsequent to these key signals are overlapped address signals for instructions granting terminal units 28 permission to receive pictures. The overlapping of this address signal is carried out in almost the same manner as the key signals.

(1) Forming the originating wave for coding the data signal;

From aforementioned VCO 49 are transmitted stable oscillating waves to the gate circuit 50. The phase of this output matches that of the VCO 55. This originating wave is the subcarrier for the address signal.

(2) Forming the continuously generated signals;

In order to overlap address signals, there are continually transmitted signals "b" and "c". The timing of these signals is the same as in the case of the key signals.

(3) Signal generated for adding the address signal;

Address signals, like key signals, are not added to all horizontal synchronizing signals, but only to those from 18L to 149L. The signal "d" therefore rises at 16L to add key signals and remains high until it comes to 149L where it falls. The signal level from 18L to 149L, therefore, is "1", causing the AND gate circuit 63 to open. Further, from the timing generator circuit 59 to the memory circuit 67 are delivered timing outputs 72, upon which the memory circuit 67 transmits to the processing circuit 74 address signals, four bits each, that correspond to address codes granting permission to receive pictures. The processing circuit 74 provides a conversion process to form 6-bit signals by adding the start and parity bits to the 4-bit address signals (group address and personal address signals) and delivers them to the shift register circuit 62.

(5) Addition of the address signal to the horizontal synchronizing signal;

The AND gate 63 receives the signals "c" and "d", and outputs from the shift register circuit 62. When each signal level is "1", the AND gate circuit 63 outputs a "1", thus causing the gate circuit 50 to open. The shift register circuit 62, upon the signal "b", transmits data blocks each consisting of six bits during the period of time of each horizontal synchronizing signal, and overlaps the address signals on the horizontal synchronizing signals, as shown in FIG. 14. When 148L is reached, the signal "d" falls, causing the AND gate circuit to close, causing no addition of data signals to the horizontal signal at 149L and thereafter. This address signal, as shown in FIG. 12, designates one group by means of one of the group addresses and transmits another signal applicable to that group by means of a personal address signal, making it possible to grant permission to receive pictures to 512 terminal units 28 in an area designated by a personal address signal within one frame. Therefore, it becomes possible to grant permission to receive pictures within one second to as many as 512×60=30720 (addresses).

(D) Providing level compression of horizontal synchronizing signals in a specific area of a picture so designated by a random number:

The TV screen, as shown in FIG. 5(b), is divided into eight sections. Whether or not each sectioned portion will be scrambled is determined by the random numbers generated by the random number generator circuit 66. Scrambling provides level compression of the horizontal synchronizing signals in the portion where the picture is to be destroyed. This level compression action is explained hereunder with reference to FIG. 15.

The video signal shown at the upper portion of the figure is the waveform before entering the encoder 30; and that at the lower portion, the waveform as transmitted from the encoder 30.

(1) Signals continuously generated;

The timing generator circuit 59 continuously transmits signals "a", having a value "1" between, with the leading edge of each horizontal synchronizing signal as the reference, 7/160 H ahead thereof and 26/160 H behind; the signals "a" are transmitted to the AND gate 65 in synchronism with the horizontal synchronizing signals while they remain generated.

(2) Signal generated when level compression is to take place;

The timing generator circuit 59, in accordance with the signals "e", transmits control signals to the shift register circuit 64. In accordance with the control signals from the timing generator circuit 59, the shift register circuit 75 transmits, in sequence, 8-bit random numbers input by the random number generator circuit 66, forming them into signals "f". In accordance with these signals "f" are transmitted 8-bit random numbers in sequence at periods divided at every 32nd H, as shown in FIG. 13. During each period of 32H these remain at "1" or "0". The signals "f" shift at a timing when the signal "h" rises, and at a position away from the horizontal synchronizing signals. Further, the signals "g", as shown in FIG. 13, cause the transmission of signals "1", between 28L and 239L of one field.

Figure 15:
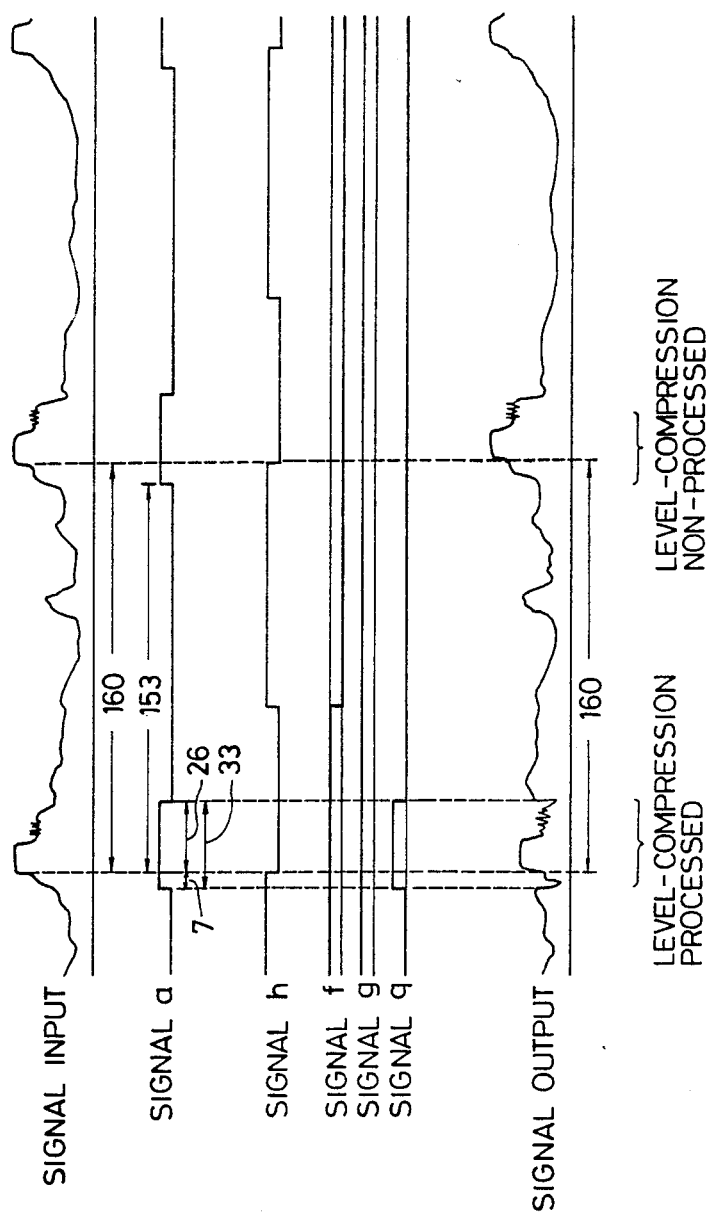
FIG. 15 is a timing chart showing the changes in signals at parts of the encoder, and video signals having been subjected to level compression.

(3) Level compression of horizontal flyback line sections;

The AND gate circuit 65, as aforementioned, receives signals "a", "f" and "g", and when all of these signals are "1", outputs a signal "1". The output "1" causes the amplification degree of the switching amplifier circuit 44 to decrease. In consequence, level compression is effected, as shown in FIG. 15, on each horizontal synchronizing signal at the portion of the flyback section (33/160H) between 7/160H ahead of the leading edge of the horizontal synchronizing signal and 26/160H following the same, shifting the compressed portion toward a gray level to carry out the so-called graysync process. However, the AND gate circuit 65, when either receiving a signal "f" or "g" changed to "0", outputs a "0", so that the switching amplifier circuit 44 does not provide level compression and transmits the corresponding horizontal flyback line section as it is, as shown in FIG. 15.

Thus, the encoder 30 adds key signals for descrambling and address signals for granting permission for picture reception into the video signals, and provides level compression of a specific horizontal flyback line section to carry out a scrambling process, while at the decoder 81, demodulation of the destroyed pictures is performed. The processes carried out in the decoder 81 include:

(D) Receiving and analyzing key signals for descrambling.

(E) Level expansion of the horizontal retrace line sections provided with level compression.

(F) Removal of the key signals added to the horizontal synchronizing signals.

(G) Receiving address signals and discrimination of permission to receive pictures.

Each process will be explained in detail hereunder. Video signals entering the decoder 81 are delivered to TV sets through the switching amplifier circuit 86, the branching unit 87, the trap circuit 88 and the output control circuit 89, respectively. The switching amplifier circuit 86 has two amplification degrees and switches to the higher amplification degree when signals "r" from the AND gate circuit 104 are "1". The trap circuit 88 operates only when signals "q" are "1".

Video signals entering the video detector circuit 90 from the branching unit 87 are detected and enter the horizontal synchronizing separator circuit 92 and vertical synchronizing separator circuit 93, which in turn, respectively, transmit horizontal synchronizing signals and vertical synchronizing signals to the counter circuit 98 and the line counter 99, respectively. The line counter 99 is reset by the output of the vertical synchronizing separator circuit 93. These reset signals, as in the case of the encoder 30, are transmitted at the 3rd H from the leading edge of each vertical synchronizing signal. The counter circuit 98, having been reset by signals "s" from the horizontal separator circuit 92, counts a stable frequency (2.5175 MHz) from the oscillator circuit 100 to precisely divide the space between horizontal synchronizing signals into 160 equal parts, and then transmits its counter output 102 to the timing generator circuit 101. Further, outputs l (160-frequency divider outputs) from the counter circuit 98 enter the line counter circuit 99. Similarly to the signals "h" from the 160-frequency circuit 57 in the aforementioned encoder 30, the outputs l rise at about the center of the space between two horizontal synchronizing signals, and these leading edges are counted by the line counter circuit 99. In the manner heretofore described, the line counter 99 detects vertical synchronizing signals and starts counting beginning with these vertical synchronizing signals, while the counter circuit 98 keeps precise timing by providing 160-frequency division using an oscillation wave from the oscillator circuit 100. The timing generator circuit 101, by means of counter outputs 102 and 103, analyzes signals delivered from the counter circuit 98 and line counter circuit 99, respectively, and directs, by means of various signals "m", "n", "p" and "q", all of the actions that the decoder 81 takes. In the meantime, the timing generator circuit 101 transmits a signal "n" of value "1", between 28L–239L; picture division signals "m", at every 32nd H from the top; signals "q", at times of horizontal synchronization signalling between 16L–148L; and signals "p", at a place between horizontal synchronizing signals. Further, part of counter outputs 103 enter the the memory processing circuit 95, as well.

The respective operations effecting the aforementioned processes (D), (E), (F) and (G) will now be explained in detail with regard to timing charts.

(D) Receiving and analyzing key signals for descrambling:

The data demodulator circuit 91 receives and separates data signals (key signals and address signals) from video signals detected by video detector circuit 90, and in turn transmits these data signals to the memory processing circuit 95, by means of data output 94. Each data signal transmitted from the data demodulator is of six bits containing a start bit and a parity bit, respectively. The memory processing circuit 95 removes the start and parity bits, thus converting each data signal into a data block consisting of four bits as shown in FIG. 16. Of the data bits in FIG. 16, the four bits at 16L and 17L together make a key signal of a total of eight bits for descrambling, and the signal of eight bits at 16L and 17L is transmitted as a key signal output 96, by means of a counter output 102, to the shift register circuit 95 and is then stored therein. This key signal is "11010011", as shown in FIG. 11, so that the memory processing circuit 95 analyzes the data signal and then generates a key signal "11010011". An 8-bit key signal enters the shift register circuit 97, which in turn generates this key signal bit by bit in sequence every time a signal "m" enters therein.

Level expansion of the horizontal flyback line section:

As aforementioned, the encoder 30 has provided level compression of the horizontal flyback line sections in portions of a picture to be destroyed, so that the decoder 81 is required to provide, in accordance with analysed key signals, level expansion of these line sections in the portions subjected to level compression. This level expansion is performed using outputs "u" from the shift register circuit 97 and signals "n" and "p" from the timing generator circuit 101.

(1) Signals continuously generated;

The horizontal synchronizing separator circuit 92 transmits to the counter circuit 98 signals "s" that fall at the leading edge of horizontal synchronizing signals not having been subjected to level compression. The counter circuit 98 is reset at the trailing edge of these signals "s", provides 160-frequency division with oscillation outputs from the oscillator circuit 100, and then transmits signals 1 as derived from 160-frequency division to the line counter circuit 99 and counter outputs 102 to the timing generator circuit. The line counter 99 counts line numbers in relation to respective horizontal scanning lines by counting signals 1, and transmits its counter outputs 103 to the timing generator circuit 101. This timing generator circuit 101 continuously transmits signals "p". These signals "p" have the value "1" only for the period of 29/160H, between 5/160H ahead of the time whereat signals 1 fall as the center to a place 24/160H behind thereof. This period of 29/160H for level expansion is shorter in time than the period of 33/160H. for level compression shown in FIG. 15.

(2) Signals required to be generated for level expansion;

Signals "n" which the timing generator circuit 101 transmits by means of outputs from the line counter circuit 99 are input to the AND gate 104. These signals "n" have values of "1" for a period between 28L and 239L, having their leading edge or trailing edge at the leading edge of signals 1. At the time when the signals "n" are other than "1", no level compression is provided. Signals "u", on the other hand, are those indicating key signals for descrambling delivered from the shift register circuit 97 by means of a "1" or "0" signal: when "1", level expansion, takes place, but when "0", it does not. These signals "u" may shift upon those signals "m" transmitted by the timing generator circuit 101, at every 32H. This is, for example, accomplished by transmitting an 8-bit signal like "11010011" bit by bit (at every 32H), and maintaining that signal "u" transmitted for a period of 32H.

Figure 17:
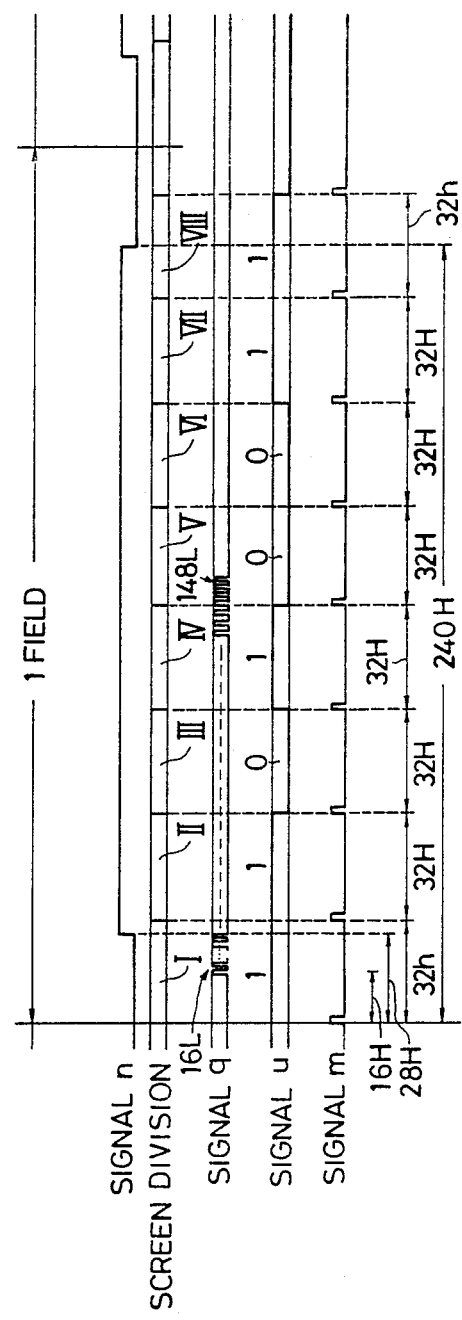
FIG. 17 is a timing chart showing the changes in signals at parts of the decoder, in one field.

The timing for respective signals "m", "n", "q" and "u" in (1), (2) and (3) is shown in a timing chart in FIG. 17.

Figure 19:
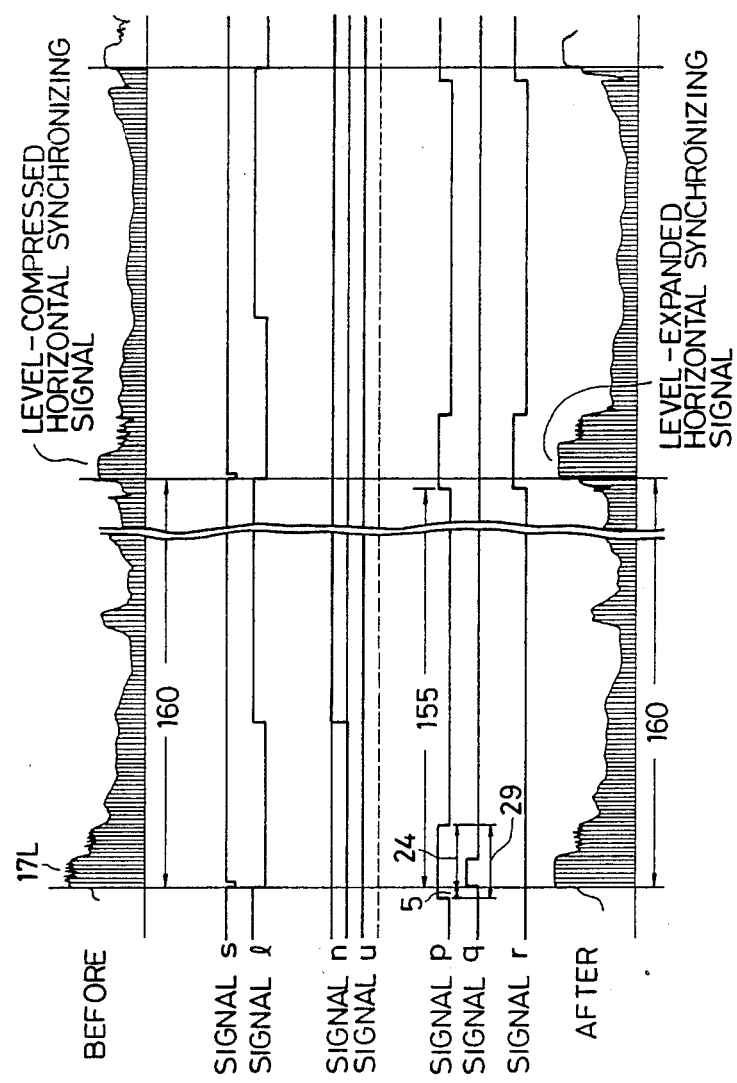
FIG. 19 is a timing chart showing the changes at parts of the decoder, between horizontal synchronizing signals and video signals having been descrambled.

(3) Level expansion of horizontal synchronizing signal (descrambling);

As mentioned above, the AND gate circuit 104 receives signals "n", "p" and "u", and, when all of these signals are "1", transmits "1" signals to the switching amplifier circuit 86 to increase its amplification degree. The period of time the switching amplifier circuit 86 is active is only while signals "p" are "1", that is for 29/160H, and which is a horizontal flyback line section. The horizontal synchronizing signal having been subjected to level compression therein is subjected to level expansion for amplification to a normal level that enables TV sets 11 to separate it. FIG. 19 shows a horizontal flyback line section having been provided with level compression, at the top center; and one returned to its original condition by level expansion, at the bottom center. Further, as shown at the bottom center, on both sides of the horizontal flyback line section there are formed valleys of 2/160H, respectively. As these are on the white level side, they neither affect horizontal synchronizing signal separation nor give any adverse affect to the picture at all. When the signals "u" are at "0", the AND gate circuit does not transmit signals to the switching amplifier circuit 86, but when the signals "m" are "0", no level compression has been provided on the horizontal flyback line section and thus it can be transmitted as it is and be separated by TV sets 11.

Figure 18:
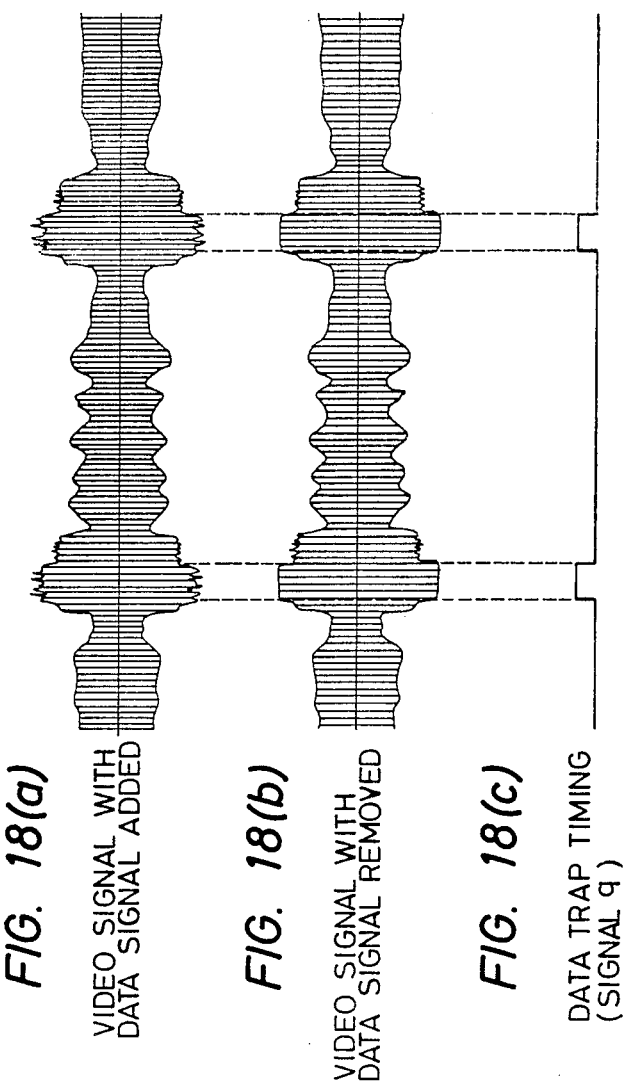
FIGS. 18(a)-(c) shows waveforms indicating the relationship between the addition and removal of data signals by means of the actual state of video signals modulated by carriers.

(F) Removal of key signals added to horizontal synchronizing signals:

As aforementioned, the horizontal synchronizing signals from 16L to 148L are added to data signals as shown in FIG. 4. If they, as they are, enter the TV sets 11, they could affect the reproduced pictures, so these data signals are required to be removed in the decoder 81. For this purpose, the timing generator circuit 101, in synchronism with the horizontal synchronizing signals from 16L to 148L, transmits to the trap circuit 88 signals "q" which are at "1" for only a period of time of 11/160H from the leading edge of a horizontal synchronizing signal. With these signals "q", the trap circuit 88 removes the data signals added into the horizontal synchronizing signals from 16L to 148L. At these signals "q" are applicable only for those horizontal synchronizing signals that are added to data signals, they do not operate on other horizontal synchronizing signals. The portion on the left hand side in FIG. 18 shows a process wherein a data signal has been removed. Waveforms at the top in FIG. 18 represent video signals before entering the decoder 81.

With a series of actions as aforementioned, the decoder 81 is able to utilize key signals delivered from the encoder 30, and descramble video signals containing horizontal flyback line sections having been subjected to level compression, remove key signals, and provide level expansion of horizontal line sections as required, in order to return the video signals to their original state so that the TV sets 11 are able to generate normal pictures.

(G) Receiving address signals and discrimination of permission for picture reception:

The video processing circuit 95 receives data demodulating signals 94 in sequence from the data demodulator circuit 91. These data demodulating signals 94, as shown in FIG. 16, are converted into data signals each consisting of four bits, of which at 16L and 17L are key signals to be transmitted to the shift register circuit 97. Those data signals from 18L to 148L are address signals, so they are transmitted from the memory processing circuit 95 upon being separated therein. Among these data signals, those from 18L to 20L are group signals; these address signals, each consisting of 11 are delivered by means of group outputs 105 to the comparator circuit 107, while those personal address signals from 21L to 148L, consisting of 512 bits, are transmitted, as personal outputs 106, to the selector circuit 108. The comparator circuit 107 receives group address numbers, each consisting of 11 bits, having been stored in the address block 109, by means of group address output 110, and the comparator circuit 107 transmits a latch signal to the latching circuit 112 upon comparing these group address numbers with the group output 105 and finding that they match (all 11 bits must completely match). The selector circuit 108, next, receives personal numbers, each consisting of the lower 9 bits out of the 20 having been stored in the address block 109, by means of the personal address output 111, and this selector circuit 108 selects and transmits only one bit represented by a personal address output from the personal address output of 512 bits. For example, if the personal address output 116 is "100111101", this indicates signal B316, and the state "1" or "0" of this signal is transmitted. This output, only when the aforedescribed group addresses have found to match, is, by means of outputs from the latching circuit 112, sent to the output control circuit 89 to constitute a "permission for reception of pictures" or a "rejection for reception of pictures".

It should be noted that FIGS. 14, 15 and 18, providing a schematic illustration for level compression of respective video signals, level expansion, and addition and removal of data signals, respectively, which show video signals different in waveform from that modulated by the carrier as achieved in accordance with this exemplary embodiment are provided for the purpose of showing timing. Each video signal used in practice, therefore, contains a carrier therein, as shown in FIG. 20. FIG. 20(a) shows the waveform of IF input signals in the state before processing; (b), the waveform of horizontal flyback line sections having been subjected to level compression; and (c), the waveform of horizontal flyback line sections subjected to level expansion, respectively, together with their timewise comparison. FIG. 18(a) shows the waveform of horizontal synchronizing signals added to data signals by the encoder 30; (b), the waveform from which the data signals have been removed by the trapping circuit 88 in the decoder 81; and (c), the waveform for the timing of the actuation of the trapping circuit 87, respectively, together with their timewise comparison.

The present invention is constructed as described above, and features the following marked advantages.

(1) The provision of level compression for the prevention of wiretapping on only the horizontal synchronizing signals enables pictures, when reproduced, to be stable and to resume their original state with the least noise and distortion.

(2) The capability of providing level compression of horizontal synchronizing signals intermittently and selectively makes it harder to demodulate the same, thus enhancing the capability of wiretapping protection.

(3) The capability of overlapping descrambling key signals and commands for permission/rejection for reception of pictures onto horizontal synchronizing signals enabling demodulation for descrambling in the same channel makes control over reception permission for each terminal unit easier.

What is claimed is:

1. A method of scrambling video signals of the type wherein each line of said video signal includes a horizontal flyback portion containing a horizontal synchronizing signal and an image portion containing video information to be displayed, said method comprising:
   (A) intermittently compressing to a prescribed quantity, in synchronism with the timing of a horizontal synchronizing signal of a TV video signal, only said flyback line section to a level well below the maximum percentage modulation of the video signal portion of the TV video signal while leaving said image portion unchanged;
   (B) overlapping key signals defining information regarding said intermittent compression of said prescribed quantity onto the horizontal synchronizing signal of the TV video signal; and
   (C) prior to said intermittently compressing step, overlapping address signals indicating whether or not terminal equipment may receive pictures, onto the horizontal synchronizing signal of the TV video signal, to thereby form a scrambled video signal including successive lines having intermittently compressed horizontal flyback sections and unchanged image portions.

2. A method according to claim 1, wherein at least a portion of said TV video signal is divided into a plurality of picture portions, each said portion being independently intermittently compressed at said horizontal synchronizing signal portion.

3. A method according to claim 2, further including periodically generating random number information and employing the numbers so generated to define picture portions to be subjected to compression.

4. A method according to claim 2, further including providing a portion of said TV video signal following a vertical flyback portion thereof which is not subjected to compression, and overlapping said key signals onto horizontal synchronizing signals of said non-compressed portion.

5. A method according to claim 3, including arranging said random numbers into digital bit blocks and employing said bit blocks as said key signals.

6. A method according to claim 4, wherein said address signals are overlapped on portions generally other than said non-compressed portion.

7. A method according to claim 6, said address signals, at a decoder, being separated into group address signals and personal address signals and analyzed for extracting an indication as to whether picture reception is permitted.

8. A scrambling device for TV pictures for scrambling video signals of the type wherein each line of video signal includes a horizontal flyback section containing a horizontal synchronizing signal and an image portion containing video information to be displayed, said device comprising:

means for overlapping address signals indicating whether or not terminal equipment may receive picture signals onto the horizontal synchronizing signal of the video signal, means for intermittently compressing the level of selected horizontal flyback portions, including the synchronizing signals on which said address signals are overlapped, while leaving said image portions unchanged, means for generating key signals defining information for expanding compressed signal portions at a decoder, and means for superposing said key signals onto selected horizontal synchronizing signals not subjected to compression, to thereby form a scrambled video signal having successive lines wherein said image portions are unchanged and said horizontal flyback portions are intermittently compressed.

9. A method of scrambling video signals in a television broadcast system of the type including means for generating an IF video signal at a central station, means for up-converting said video signal to a higher frequency and means for transmitting the up-converted video signal from said central station to a plurality of subscribers, and wherein each line of said video signal includes a horizontal flyback portion containing a horizontal synchronizing signal and an image portion containing video information to be displayed, said method comprising the steps of:

(A) at a point subsequent to the generation of said IF video signal, intermittently compressing to a prescribed quantity, in synchronism with the timing of a horizontal synchronizing signal of a TV video signal, only said flyback line section to a level well below the maximum percentage modulation of the video signal portion of the TV video signal while leaving said image portion unchanged;

(B) overlapping key signals defining information regarding said intermittent compression of said prescribed quantity onto the horizontal synchronizing signal of the TV video signal; and (C) overlapping address signals indicating whether or not terminal equipment may receive pictures, onto the horizontal synchronizing signal of the TV video signal, to thereby form a scrambled video signal including successive lines having intermittently compressed horizontal flyback sections and unchanged image portions.

10. A scrambling device for TV pictures for scrambling video signals in a television broadcast system of the type including means for generating an IF video signal at a central station, means for up-converting said video signal to a higher frequency and means for transmitting the up-converted video signal from said central station to a plurality of subscribers, and wherein each line of video signal includes a horizontal flyback section containing a horizontal synchronizing signal and an image portion containing video information to be displayed, said device comprising:

means downstream of said means for generating said IF video signal for intermittently compressing the level of selected horizontal flyback portions while leaving said image portions unchanged, means for generating key signals defining information for expanding compressed signal portions at a decoder, and means for superposing said key signals onto selected horizontal synchronizing signals not subjected to compression, to thereby form a scrambled video signal having successive lines wherein said image portions are unchanged and said horizontal flyback portions are intermittently compressed.

* * * * *